United States Patent [19]

Hosaka et al.

[11] Patent Number: 5,392,121
[45] Date of Patent: Feb. 21, 1995

[54] SPECKLE INTERFEROMETRY SPATIAL FILTERS OR THE LIKE TO ACHIEVE USING PHASE SELECTION

[75] Inventors: Kotaro Hosaka, Ushiku; Hiroji Narumi, Kawasaka, both of Japan

[73] Assignee: Canon Kabushiki Kaisha, Tokyo, Japan

[21] Appl. No.: 953,045

[22] Filed: Sep. 29, 1992

[30] Foreign Application Priority Data

Sep. 30, 1991 [JP] Japan .................................. 3-278794
Aug. 24, 1992 [JP] Japan .................................. 4-247248

[51] Int. Cl.$^6$ .............................................. G01B 9/02
[52] U.S. Cl. ...................................... 356/360; 356/351
[58] Field of Search ................ 356/347, 351, 360, 359

[56] References Cited

U.S. PATENT DOCUMENTS 4,913,547  4/1990  Moran .................................. 356/349
5,127,731  7/1992  De Groot .............................. 356/349

Primary Examiner—Samuel A. Turner
Assistant Examiner—Robert Kim
Attorney, Agent, or Firm—Fitzpatrick, Cella, Harper & Scinto

[57] ABSTRACT

It is an object of the present invention to provide a speckle interference apparatus capable of selecting given phase information at a speed higher than speckle interference fringe patterns with a higher precision. For a speckle interference apparatus in which a light beam from a light source is divided into plural light beams, and one of the light beams is passed through a measuring surface and the other light beam through a reference surface to be superposed respectively for the formation of speckle interference fringe patterns, there are arranged in the optical paths spatial filters having windows for sampling the area of a given phase among the speckle interference fringe patterns. Hence, with such filters, speckle interference fringe patterns of the same phase are produced.

25 Claims, 15 Drawing Sheets

SPECKLE INTERFEROMETRY SPATIAL FILTERS OR THE LIKE TO ACHIEVE USING PHASE SELECTION

BACKGROUND OF THE INVENTION

1. Field of the Invention

The present invention relates to a speckle interference apparatus. More particularly, the invention relates to a speckle interference apparatus having means for drawing phase information to enable the phase information of speckle interference fringe patterns (speckle patterns) to be detected with a high precision, for example.

2. Related Background Art

There have hitherto been proposed various measuring apparatuses in which the coherent light emitted from a light source is irradiated onto the light diffusion surface of an object to be measured, and the interference fringes thus obtained from the measurement object, the so-called speckle interference fringes, are utilized for the purpose. These measuring apparatuses have a wide range of applications because non-contact measurements can be conducted without selecting measuring planes.

In this respect, the way to draw the required information form the speckle interference fringes which are fundamentally regarded as noise is an important factor to be considered for speckle pattern application measurements.

In conventional measuring apparatuses utilizing the speckle patterns, spectral analyses are carried out on the shifting amounts and changes of sizes of speckle interference fringes in accordance with the frequency signals obtained from light receiving elements to read the shifting amount by integrating the frequency shifts proportional to the traveling velocity of the object to be measured. Also, as these light receiving elements, CCDs are employed in many cases and, therefore, image processing is required to process the signals thus obtained.

Here, although there is a feature for the various measurements utilizing speckle interferometers that measurements can be performed regardless of the condition of the measuring surface(s), it is difficult to effectively generate measurable interference fringes for diverse measuring planes unless the reflective amount of light from the reference surface is adjusted in response to the reflectivity of the respective measuring surfaces.

Conventionally, a measuring apparatus using speckle interferometers uses a reference surface having substantially the same reflectivity as the measuring surface in order to enhance the speckle interference fringes to the extent that its contrast can be processed or inserts an ND filter into the portion where the reflectivity is higher to balance the amounts of light.

In the conventional speckle interference apparatus, however, there is a problem that the light receiving elements and the signal processing method are complicated when the image processing is executed. Furthermore, there has been a problem that it is difficult to conduct high-speed data processing due to the signal processes required for the CCD, image processing, and others.

Further, there has been a problem with the allowable speed of the measurable traveling and changes of an object being limited by the speed with which the image processing and other signal processes are executed.

Further, for the method which utilizes the nature of the speckle itself, the measuring surface should be throughly rough, and if it is a mirror or glossy surface, the intended measurement becomes difficult.

And further, the method using the ND filter when the reflective amounts of light from the measuring surface and reference surface should be adjusted, has caused a problem that the reference surfaces and ND filters must be replaced each time the measuring plane is changed. Nor is it possible to adjust the balance of the amounts of light continuously, which presents a great difficulty in enhancing the contrast of the interference fringes effectively.

SUMMARY OF THE INVENTION

It is an aspect of the present invention to provide a speckle interference apparatus in which speckle interference fringes are divided into two directions, and in front of light receiving elements, an appropriate physical window is arranged to face the speckle interference patterns and, further, there is provided a means for picking up phase information, which is capable of picking up the required information effectively with simple and high-speed light receiving elements and signal processing from the speckle interference patterns by means of opening or closing the foregoing window so as to select the speckle interference patterns of some one phase.

It is another aspect of the present invention to provide a speckle interference apparatus capable of performing a highly precise measurement at all times irrespective of the conditions of the measuring surfaces, rough or mirror-like, and also capable of adjusting easily and rapidly the ratio of reflective amounts of light from the measuring surface and the reference surface in order to easily obtain higher contrast among speckle interference fringes even when the reflectivity of the measuring surface varies.

DETAILED DESCRIPTION OF THE PREFERRED EMBODIMENTS

Figure 1:
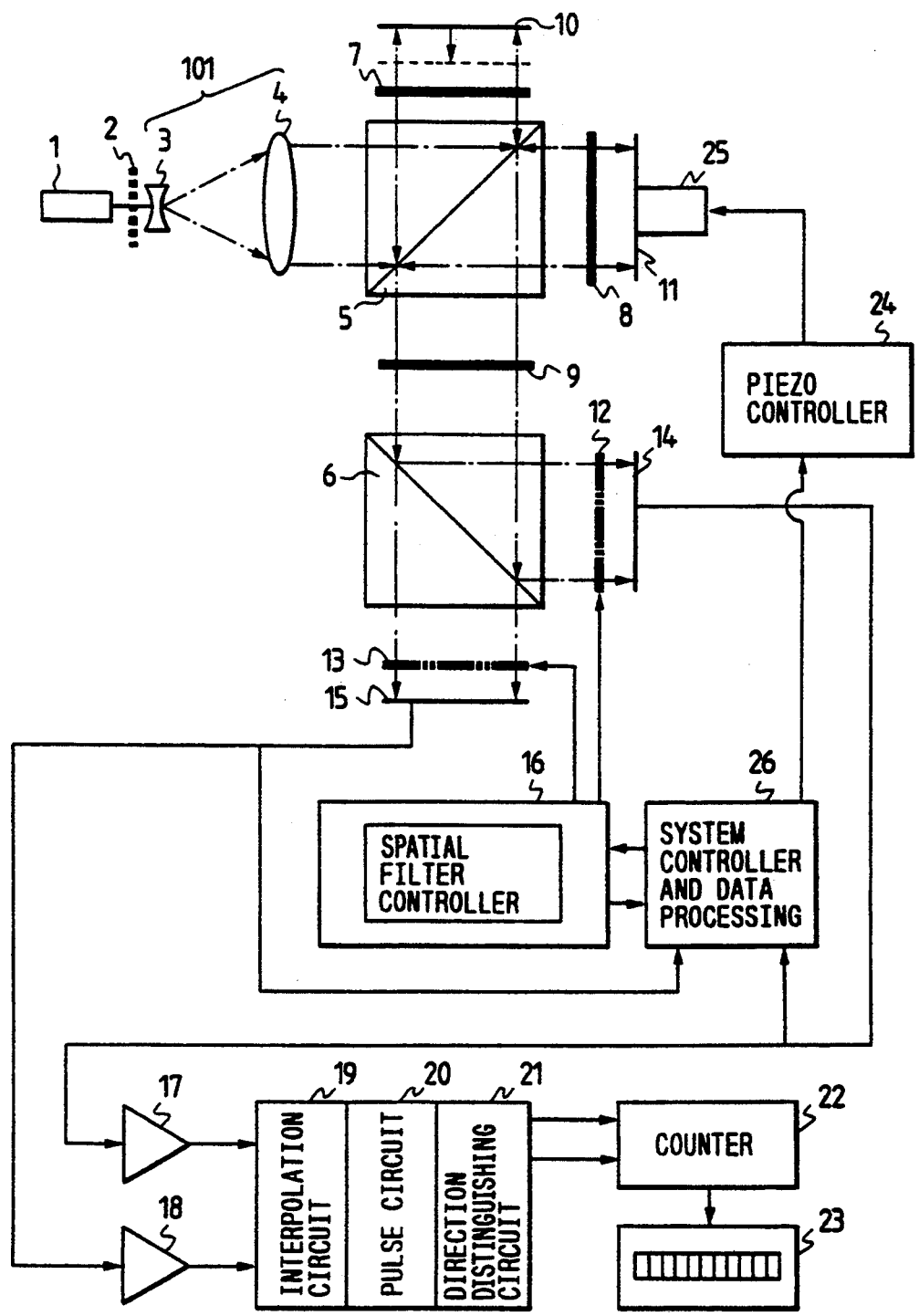
FIG. 1 is a view schematically showing principal portion of the embodiment 1 according to the present invention.

FIG. 1 is a view schematically showing the principal portion of the embodiment 1 according to the present invention. In FIG. 1, there is exemplified a case where a speckle interference apparatus measures the shifting amount of an object (shift information) by drawing the phase information from the speckle interference fringe patterns.

In FIG. 1, a reference numeral 1 designates a laser emitting coherent light of a wavelength $\lambda$; 2, a $\lambda/2$ ("half-wavelength") plate; 101, a beam expander having two lenses 3 and 4 to expand and collimate the light beam from the laser 1; and 5 and 6, polarization light beam splitters, respectively, to allow linearly polarized rays of light in a predetermined direction to pass and to be reflected.

Reference numerals 7, 8, and 9 designate $\lambda/4$ ("quarter-wavelength") plates, respectively; 10, the light diffusion surface (measuring surface) of an object to be measured; 11, a reference surface which is smooth and flat; 12 and 13, spatial filters having one or plural physical windows; and 14 and 15, light receiving elements provided with photodiodes, for example.

A reference numeral 16 designates a controller to open and close the physical windows; 17 and 18, buffer amplifiers to adjust the amplitude and offset of electric signals; 19, an interpolation circuit to divide the phase of electric signals for higher resolving power; 20, a pulse circuit to convert the analogue signals into digital pulse signals; 21, a direction distinguishing circuit for discriminating the shift directions to output up and down pulses; 22, a counter to count the up and down pulses; 23, a display for displaying the numerical values measured by the counter 22; 24, a piezo controller to actuate piezoelectric elements 25; 25, the piezoelectric elements to shift the reference surface 11; and 26, a system controller to control the selection sequence and others for the speckle interference fringe patterns, and a data processing unit for calculating phases.

In the present embodiment, the linearly polarized coherent light beam emitted from the laser 1 is expanded by the beam expander 101 through the $\lambda/2$ plate 2 to enter the polarized light beam splitter 5 as parallel rays of light. At this juncture, the intensity ratio between the reflective light and transmitting light of the foregoing linearly polarized rays of light at the polarized light beam splitter 5 is adjusted by the rotational angle of the $\lambda/2$ plate 2 which rotates around the optical axis.

The reflective light from the polarized light beam splitter 5 becomes circularly polarized light through the $\lambda/4$ plate 7 and is irradiated onto the measuring plane 10. The scatteringly reflected rays of light (signal light) at the diffusion surface of the measuring surface 10 again pass the $\lambda/4$ plate 7 to become linearly polarized light orthogonal to the reflective light from the polarized light beam splitter 5, and is transmitted through the polarized light beam splitter 5.

On the other hand, of the incident rays of light incident on the polarized light beam splitter 5 as parallel rays of light from the beam expander 101, the transmitting light passes the $\lambda/4$ plate 8 to become circularly polarized light to be reflected at the reference surface 11 and return to the beginning optical path of the foregoing reflected light (reference light). Then, it passes again the $\lambda/4$ plate 8 to become linearly polarized light orthogonal to the foregoing transmitting light. And it is reflected by the polarized light beam splitter 5 to travel through the same light path for the signal light from the measuring surface 10.

The signal light from the measuring surface 10 and the reference light from the reference surface 11 which gather at the polarized light beam splitter 5 pass through the $\lambda/4$ plate 9 to interfer with each other as circularly polarized light to form speckle interference fringe patterns. Then, they are divided into the reflective light and transmitting light by means of the polarized light beam splitter 6 to carry the respective speckle interference fringe patterns into the spatial filters 12 and 13 having one or plural physical windows.

Figure 2:
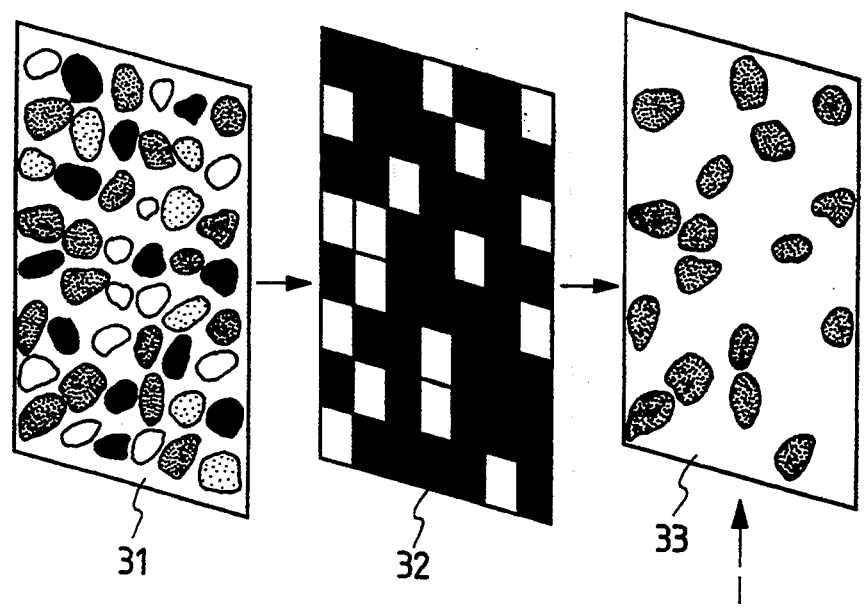
FIG. 2 is a view for explaining spatial filters according to the present invention.
Figure 2:
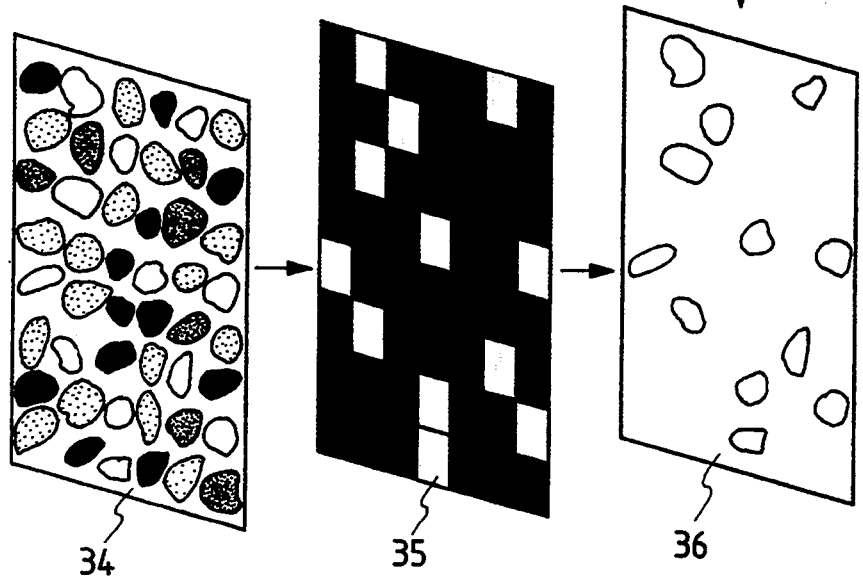

FIG. 2 is a view for explaining the spatial filters 12 and 13 according to the present embodiment.

In FIG. 2, reference numerals 32 and 35 designate matrix liquid crystal shutters serving as the respective spatial filters; 31 and 34, the speckle interference fringe patterns consisting of a plurality of speckle interference fringe particles, which are represented on the liquid crystal shutters 32 and 35; and 33 and 36, the representations of the speckle interference fringe patterns selected by the liquid crystal shutters 32 and 35.

In FIG. 1, the spatial filters 12 and 13 are actuated to open or close their windows in accordance with corresponding instructions by a spatial filter controller 16 which controls opening and closing of the windows of the spatial filters 12 and 13 while fetching the output signals from the light receiving elements 14 and 15. Of the speckle interference fringe patterns, those which are to enter the light receiving elements 14 and 15 are thus selected.

Here, two patterns having passed the spatial filters 12 and 13 respectively of the speckle interference fringe patterns selected by the spatial filters 12 and 13 will be of the same phase whereas at the spatial filters 12 and 13, the phases of the speckle interference fringe patterns deviate by 90° from each other.

In other words, in FIG. 2, given the speckle interference fringe patterns on the spatial filter 12 as 31, with the liquid crystal shutter 32 as the spatial filter 12 in FIG. 1, the speckle interference fringe paterns on the spatial filter 13 as 34, and the liquid crystal shutter 35 as the spatial filter 13 in FIG. 1, the relationship between the selected speckle interference fringe patterns 33 and 36 corresponds to the phase deviation of 90°.

The speckle interference fringe patterns 31 on the spatial filter 12 and the speckle interference fringe patterns 34 on the spatial filter 13 have a phase difference of 180° from the beginning because they are related to the reflective light and transmitting light from the polarized light beam splitter 6, respectively.

In the present embodiment, it may be possible to apply a method such as shifting the reference surface 11 by an amount λ/2 in the axial direction as an example of the selection method for speckle interference fringe patterns. To this end, the shutter for the filter 12 or filter 13 is arbitrarily opened at first and then the reference surface 11 is shifted by an amount λ/2 in the axial direction by actuating the piezoelectric element 25 according to an instruction by the piezocontroller 24. As a result, the speckle interference fringe patterns corresponding to the location where the shutter is opened generate light and shade changes for one cycle, thereby to make it possible to obtain sine wave signals for one cycle from the light receiving element 14 or light receiving element 15.

Now, given the data drawn in the data processing 26 by dividing this portion equally into n sectors for sampling as D(i) and the arrays of the numerical values having the divided portions into n sectors of sin wave and cos wave for one cycle produced by the data processing 26 as sin(i) and cos(i), the phase $\phi$ of the speckle interference fringe patterns at this position can be obtained by executing a calculation in the data processing 26 according to the following equation:

$$\phi = \tan^{-1}\left( \sum_{i=1}^{n} (D(i) \times \sin(i)) / \sum_{i=1}^{n} (D(i) \times \cos(i)) \right)$$

By repeating this process for an arbitrary number of times while changing the positions which the shutter of the spatial filter is opened, it is possible to select a plurality of speckle interference fringe particles of the same phase or a phases deviated by an angle of 90°.

The above-mentioned selection sequence of the speckle interference fringe patterns is controllable for its execution by means of the system controller 26.

Although it is effective enough to select only one speckle interference fringe pattern particle for the spatial filters 12 and 13 respectively, the incident amounts of light incident on the light receiving elements 14 and 15 will be increased by selecting plural particles therefor to strengthen the power against external disturbances and noise by averaging them. The light receiving elements 14 and 15 serve to transduce the alternation of the amounts of light into that of electric signals. The electric signals output from the light receiving elements 14 and 15 vary by the shift of the reference surface 11, and the rays of light having phases which are deviated by an angle of 90° from each other are transmitted through the spatial filters 12 and 13. Accordingly, the phases of the electric signals are also deviated by an angle of 90° from each other.

For example, when the electric signal from the light receiving element 14 is a sine wave, the electric signal from the light receiving element 15 will be a sine wave having a phase which is deviated at an angle of 90°. The signal processing is thereafter a general processing such as to produce up and down pulses from two signals.

Now, an example therefor will be described. The electric signal from the light receiving element 14 (or 15) enters the interpolation circuit 19 through the buffer amplifier 17 (or 18). In the interpolation circuit 19, intermediate phases are further produced from the two electric signals having their phases deviated at an angle of 90° (i.e., an angle of 90° apart) to implement the enhancement of resolution. Then, they are converted into pulse signals in the subsequent pulse circuit 20. Thus, the shifting direction of the measuring plane 10 is discriminated by the direction distinguishing circuit 21 to produce up and down pulses. The up and down pulses output from the direction distinguishing circuit 21 are measured by the counter 22 thus displaying on the display 23 the shifted amounts of the measuring plane 10 as numerical values.

In the present embodiment, the shift information of the measuring plane 10 is detected and displayed as above. As a result, it becomes possible to execute a highly precise measurement irrespective of whether the surface of the measuring surface is rough, mirror-like or glossy.

Figure 3:
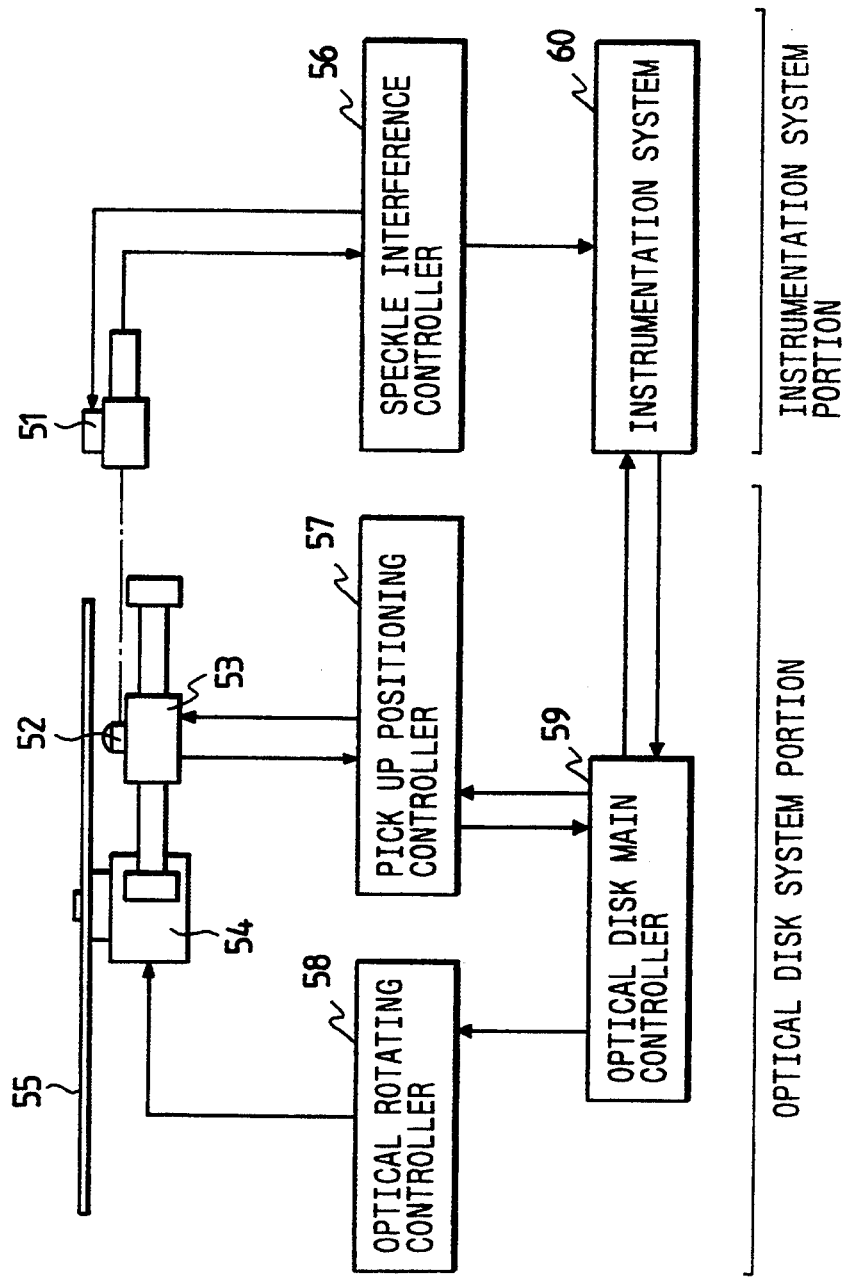
FIG. 3 is a view schematically showing the principal portion of the embodiment 2 according to present invention.

FIG. 3 is a view schematically showing the principal part of embodiment 2 according to the present invention.

In the present embodiment, the speckle interference apparatus is used for directly measuring the position of an optical pick up for an optical disc drive. An example is shown therein to disclose an application to an optical disc drive inspection device in which it is utilized for measuring the actuating and positioning capability of an optical pick up.

In FIG. 3, a reference numeral 51 designates a speckle interference apparatus; 52, an optical pick up; 53, the actuating stage for the optical pick up 52; 54, a motor for rotating a disc; 55, an optical disc; 56, a speckle interference controller for processing data on the speckle interference apparatus 51; 57, a pick up positioning controller for actuating the actuating stage 53 to control the positioning of the optical pick up 52 for tracking; 58, a controller for controlling the rotation of the disc rotation motor 54; 59, an optical disc main controller for controlling the optical disc system; and 60, a measuring system for instructing measurement algorithms to total the measured data.

In the present embodiment, the measuring system 60 sends instructions to the optical disc main controller 59 for shifting and positioning the optical pick up 52 in accordance with the algorithms for inspections.

Subsequently, the optical disc main controller 59 instructs to the disc rotation controller 58 and the pick up positioning controller 57 for performing positioning servo-control as required. The pick up positioning controller 57 shifts the driving stage 53 in accordance with the instructions from the optical disc main controller 59 to execute the positioning servo-control while reading the tracking signals from the pick up 52. These series of positioning operations are read by using the speckle interference controller 56 through the speckle interference apparatus 51 to transfer the data thus read to the measuring system 60.

The measuring system 60 executes an operational processing on the basis of the positional information regarding the optical pick up 52 obtained from the speckle interference apparatus to output the results of measurements such as the positioning reproducibility, positioning time, and serve vibrations as well as resonance frequency at the time of positioning, thus conducting the inspection and evaluation of the optical disc system.

In this case, by reading the shifting information of the optical pick up 52 directly with the speckle interference apparatus 51, it becomes possible to read the repositions of the optical pick up 52 itself which do not contain any deformations of or errors caused by the driving stage 53 as in the case where the shifting information of the driving stage 53 is read for the purpose. Also, there is no need for affixing any mirror portion to the barrel of an optical pick up 52 so as to prevent the optical pick up 52 which is fundamentally light from being made unnecessarily heavy.

Furthermore, it is possible for a speckle interference apparatus according to the present invention to perform the measurements which cannot be practiced unless the response to the measuring systems such as servo vibrations and resonance is rapid because there is no need for considering any image processing or others which may cause the velocity of sampling the measurements to be delayed. It is also possible to enhance the inspection efficiency as a matter of course because no special treatment is required such as affixing a mirror to the optical pick up 52.

Furthermore, the present invention is applicable as a general displacement gauge usable for configuration measurements of various parts, deflection measurements of the rotational shaft of a motor or others, and vibration measurement, or as a positioning sensor for a stage and the like.

Figure 4:
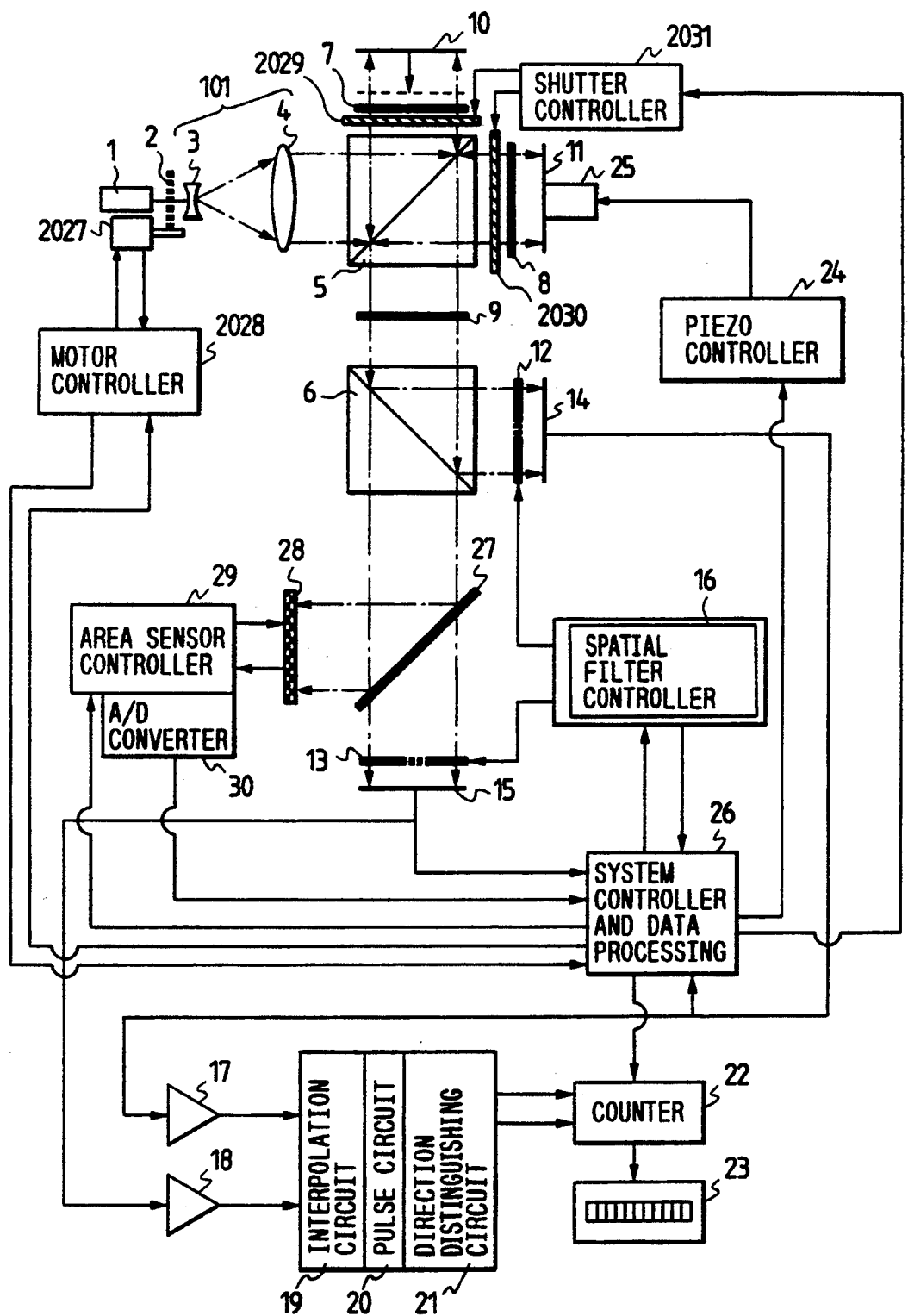
FIG. 4 is a view schematically showing the principal portion of embodiment 3 according to the present invention.

FIG. 4 is a view schematically showing the principal part of the embodiment 3 according to the present invention.

In FIG. 4, the same reference numerals are provided for the same elements as those appearing in FIG. 1.

In the present embodiment, what differs from embodiment 1 described in conjunction with FIG. 1 is that the windows of the spatial filters are made variable in accordance with the positional shifts of the speckle interference fringe particles. Thus, the phase information regarding the speckle interference fringe patterns are sampled to make it possible to execute a highly precise measurement as in case of the embodiment 1 irrespective of whether the measurement surface is rough or mirror-like.

Now, the description will be explain the features of the structure of the present embodiment.

In FIG. 4, each of the elements designated by reference numerals 1 to 26 is identical to the one shown in FIG. 1.

Reference numeral 27 designates a half mirror; 28, an area sensor for measuring the initial phase of speckle interference fringe particles (one of the patterns constituting the speckle interference fringe); 29, an area sensor controller for actuating the area sensor 28; 30, an A/D converter for converting the analogue output of the area sensor into the digital one; 2027, a motor with an absolute type encoder motor for rotating the λ/2 plate 2; 2028, a motor controller for controlling the motor 2027 with the encoder; 2029 and 2030, shutters capable of cutting individually the rays of light traveling to the measuring surface 10 and the reference surface 11, respectively; and 2031, a shutter controller for controlling the shutters 2029 and 2030 in accordance with the instructions from the system controller 26.

Figure 5:
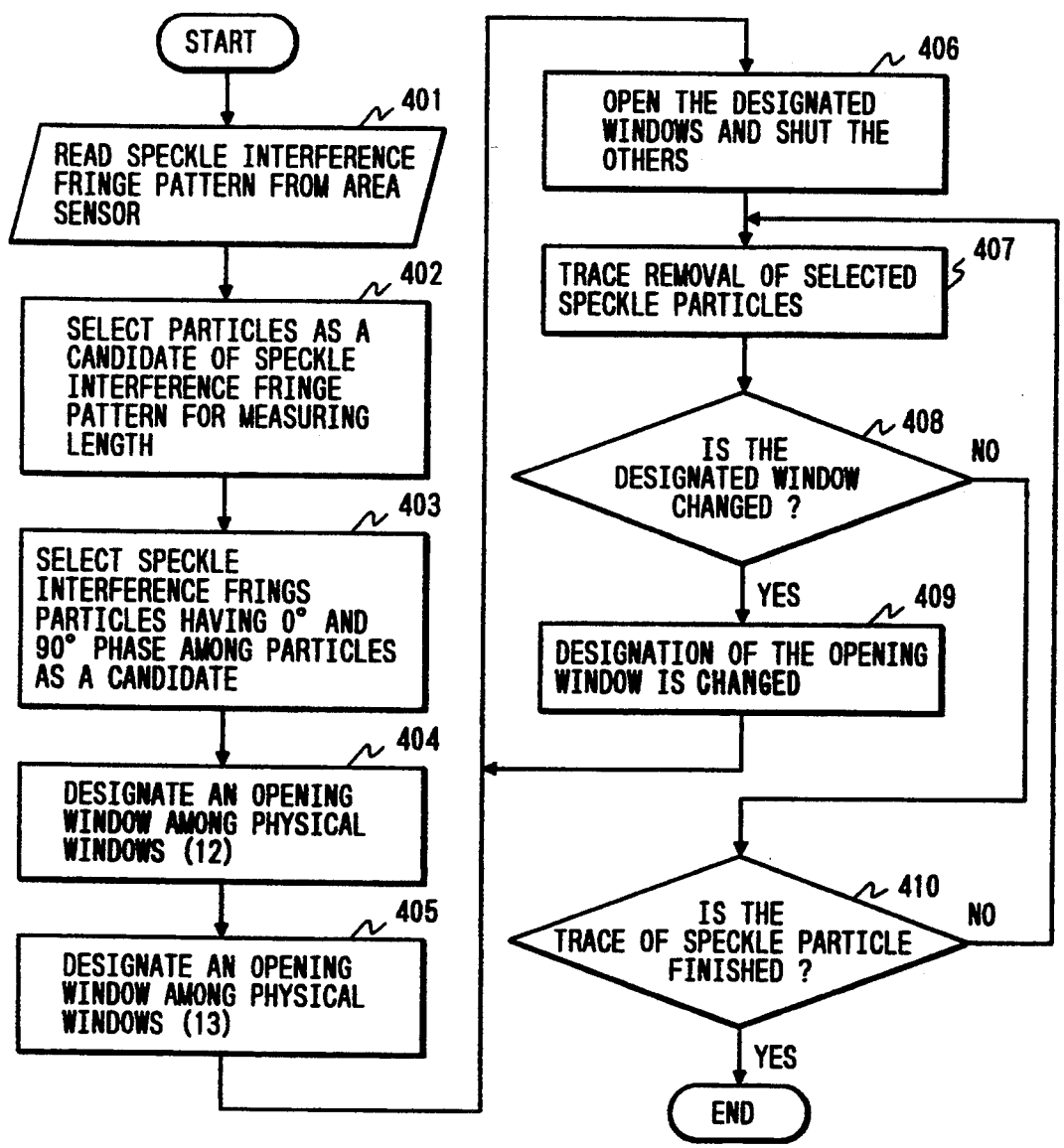
FIG. 5 is a flowchart for explaining the sequence flow for embodiment 3 according to the present invention.

FIG. 5 is a view showing the process flows for selecting speckle interference fringe particles and for tracing the selected speckle interference fringe particles. In FIG. 5, a reference numeral 401 designates an image data reading process for reading speckle interference fringe patterns from the area sensor 28; 402, a first stage of the particle selection process to select as a first stage candidate speckle interference fringe particles to be used at the time of measuring length; 403, a second stage of the particle selection process to select further speckle interference fringe particles having phases of 0° and 90° as a second stage from the speckle interference fringe particles selected as a candidate by the process 402; 404, a window specifying process to designate a window to be opened at the physical window 12 for those of the speckle interference fringe particles selected in the process 403; 405, a window specifying process to designate a window to be opened at the physical window 13 for the selected speckle interference fringe particles selected in the process 403; 406, a window opening and closing process to open the window designated by the process 404,405, or 409 and to close the other windows; 407, a particle shift tracing process to trace the shifting of the speckle interference fringe particles selected by the process 403; 408, a process for determining whether it is necessary to change the window to be opened or closed in accordance with the shifting of the speckle intererence fringe particles; 409, an open and close designation changing process to change the open and close designation of the window for which a change is determined by the process 408; and 410, a process for determining whether it is necessary to finish the window switching process by pausing the tracing of the selected speckle interference fringe particles.

Figure 6:
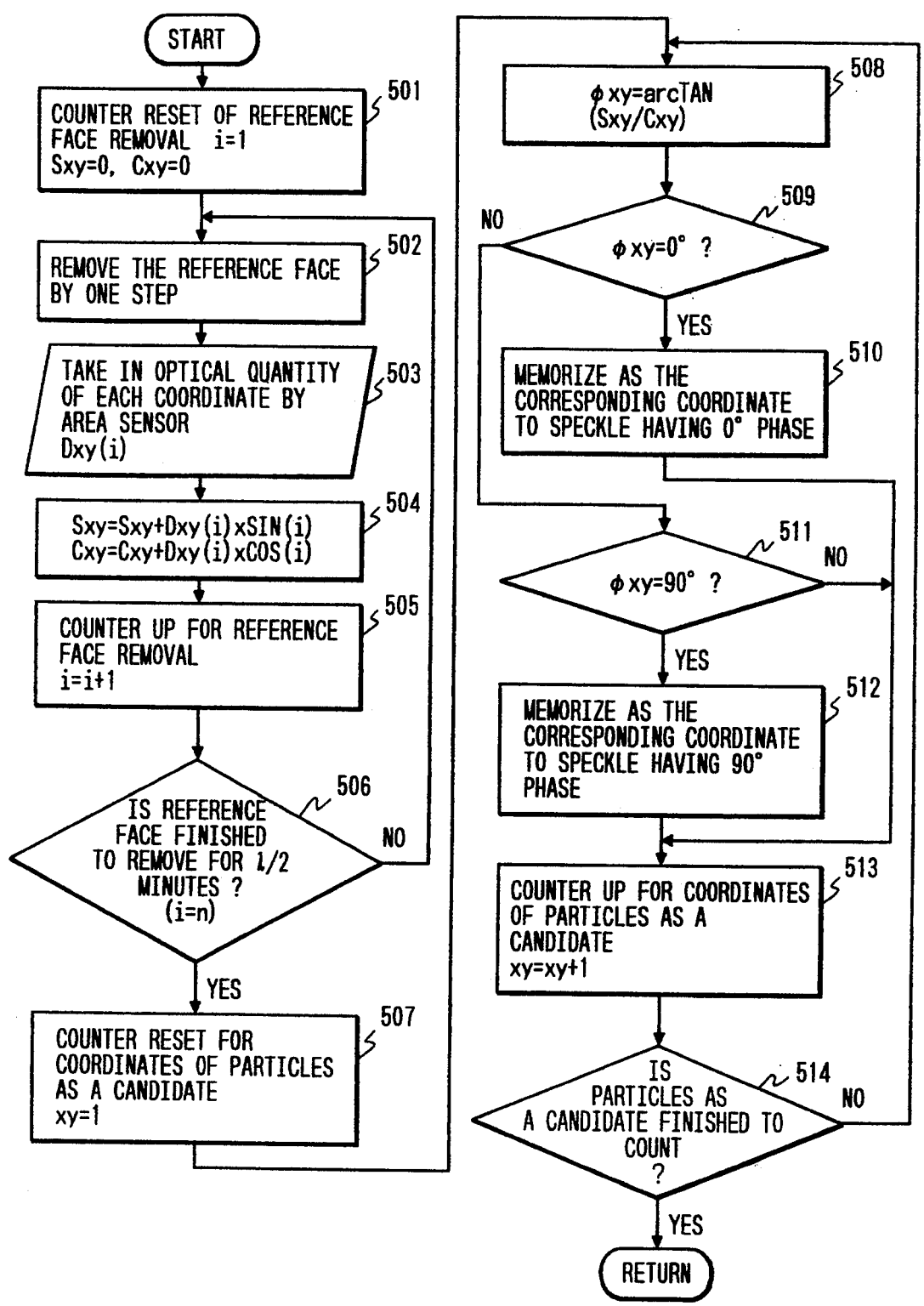
FIG. 6 is a flowchart for explaining selective sequence flow for the speckle interference fringe particles for the embodiment 3 according to the present invention.

FIG. 6 is a view showing the process flows to select the speckle interference fringe particles having a phase difference of 90°, which represents the contents of the process 403 in FIG. 5. In FIG. 6, a reference numeral 501 designates a counter resetting process to reset a step shifting counter which enable the reference surface 11 to be step-shifted; 502, a process for actuating the piezoelectric element 25 to allow the reference surface 11 to be step-shifted; 503, an amount of light drawing process to draw the amount of light detected by each of coordinate sensors by means of the area sensor 28 and assign such an amount to a variable after being digitized by means of the A/D converter 30; 504, a calculating process to calculate the sum of the values drawn in the process 503 by multiplying them by SIN coefficient and COS coefficient; 505, a counting process to count up the step shifting counter for the reference surface step shifting; 506, a process for determining whether the reference surface 11 has completed its shifting for a λ/2 portion or not; 507, a counter resetting process to reset a candidate particle coordinate counter for the speckle interference fringe particles; 508, a calculating process to calculate phase angles in accordance with the calculated Sxy and Cxy during from the processes 502 to 506; 509, a process for determining whether the phase angles calculated in the process 508 are 0° or not; 510, a process to store the speckle interference fringe particles corresponding to the candicate particle coordinate counter for the current speckle interference fringe particles as the speckle interference fringe particles having 0° phase angle; 511, a process for determining whether the phase angle calculated in the process 508 is 90° or not; 512, a process to store the speckle interference fringe particles corresponding to the candidate particle coordinate counter for the current speckle interference fringe particles as the speckle interference fringe particles having 90° phase angle; 513, a counting process to count up the candidate particle coordinate counter for the speckle interference fringe particles; and 514, a process to determine whether all the discriminations for the candidate particles of the speckle interference fringe particles are finished or not.

In the above-mentioned constitution, the linearly polarized coherent light emitted from the laser 1 is expanded by the lenses 3 and 4 to make it parallel rays of light through the λ/2 plate 2. In the polarized light beam splitter 5, the power ratio of the reflecting light and transmitting light resulting from the rotational angles of the λ/2 plate 2 which rotates around the optical axis is caused to vary thus enabling the amounts of light of the measuring surface 10 and reference surface 11 to be automatically balanced by controlling the motor controller 2028 through the system controller 26 to rotate the λ/2 plate 2. The light reflected by the polarized light beam splitter 5 is irradiated onto the measuring surface 10 through the λ/4 plate 7. The rays of light scatteringly reflected on the diffusion surface of the measuring surface 10 are transmitted through the polarized light beam splitter 5 this time after passing through the λ/4 plate 7 again. Of the incident light to the polarized light beam splitter 5 as the parallel rays of light from the lenses 3 and 4, the transmitting light is allowed to pass through the λ/4 plate 8 and reflected by the reference surface 11 to pass again through the λ/4 plate 8, thus being reflected the polarized light beam splitter 5 this time to get together with the rays of light from the measuring surface 10. The rays of light from the measuring surface 10 and reference surface 11 which are combined at the polarized light beam splitter 5 are allowed to pass through the λ/4 plate 9 and divided into two directions by means of the polarized light beam splitter 6, hence representing speckle interference fringe patterns respectively on the air filters 12 and 13 having one or plural physical windows. Here, as the spatial filters 12 and 13, it may be conceivable to adopt matrix type liquid crystal shutters 32 and 35 as shown in FIG. 2, for example. Reference numerals 31 and 34 in FIG. 2 represent the speckle interference fringe patterns on the liquid crystal shutters 32 and 35 while those of 33 and 36 in FIG. 2 represent the speckle interference fringe patterns selected by the liquid crystal shutters 32 and 35. In this case, the half mirror 27 is arranged in at least one of the optical paths for the rays of light divided by the polarized light beam splitter 6 into the two directions, and there are represented on the area sensor 28 the same speckle interference fringe patterns represented on the spatial filter 12 or 13. The spatial filters 12 and 13 are caused to open and close its windows in accordance with the instructions from the spatial filter controller 16 which controls the windows of the spatial filters to be opened or closed, and to select among the speckle interference fringe patterns, those patterns which will reach the light receiving elements 14 and 15. The speckle interference fringe patterns selected here are of a same phase on the spatial filters 12 and 13 whereas the phases of the filters 12 and 13 are deviated at an angle of 90° to each other. More specifically, given the speckle interference fringe patterns on the spatial filter 12 as 31 in FIG. 2, the liquid crystal shutter 32 as the spatial filter 12, the speckle interference fringe patterns on the spatial filter 13 as 34, and the liquid crystal shutter 35 as the spatial filter 13, the relationships between each of the selected speckle interference fringe patterns 33 and 36 corresponds to the the phase deviation of 90°. The speckle interference fringe patterns 31 on the spatial filter 12 and the speckle interference fringe patterns 34 on the spatial filter 13 have a phase difference of 180° from the beginning because their relation is the one between the light reflected by and the light transmitted through the polarized light beam splitter 6, respectively.

Now, the description will explain the preliminary process and the process of measuring length including a method to select speckle interference fringe particles for the physical windows in order to allow the apparatus to operate as an instrument for measuring length in the present embodiment, for example. Laser light is irradiated onto the measuring plane 10, a target object, and an instruction is sent to the system controller 26 to begin a length measurement preparation. Then, at first, an image formed by the speckle interference fringe particles is drawn through the area sensor 28 in the process 401. By the process 402, the candidate for the speckle interference fringe particles to be utilized for the length measurement is determined from this image on the basis of the size and configuration. Thus, by the process 403, the speckle interference fringe particles having phases of 0° and 90°, that is, the speckle interference fringe particles having a phase difference of 90° are selected from the foregoing candidate particles. In this respect, as an example of such a selection method for the speckle interference fringe patterns, there is a method in which the reference surface 11 is shifted in the direction of the optical axis for a portion of λ/2 in order to measure the initial phases of the speckle interference fringe particles one by one from the light and shade changes per cycle of the speckle interference fringe particles. By the process 501 in FIG. 6, the shifting counter i for the reference surface 11 is reset to 1 by the piezoelectric element 25 to clear the variables Sxy and Cxy to be zero for each of the candidate particles. In the process 502, the piezo controller 24 actuates the piezoelectric element 25 to cause the reference surface 11 to be shifted by one step in the direction of the optical axis. The shifting amount for this one step is equally devided into the n sector portion of the λ/2. Here, theoretically, the n can be a divided number whereby to determine sine wave, but the more numbers of n, the better in order to restrain errors from being generated due to noise and the like. After in the process 503 subsequent to this shift, the amount of light at coordinate xy is drawn for each of the candidate particles by the area sensor 28 and is defined as Dxy(i). Then, by the process 504, the following calculation is executed with the Dxy(i) and the numerical value arrays SIN(i) and COS(i) prepared in advance in the data process 26 by equally dividing SIN and COS of one cycle by a number n:

$$Sxy = Sxy + Dxy(i) \times \mathrm{SIN}\,(i),$$

$$Cxy = Cxy + Dxy(i) \times \mathrm{COS}\,(i)$$

Then, by the process 505, the shifting counter i for the reference surface 11 is counted up to determine in the process 506 whether the reference surface 11 has completed shifting for the portion of λ/2 or not. If it is NO, the sequence will return to the process 502 to repeat a cycle of from the processes 502 to 505. In the process 506, if it is YES, the sequence will proceed to the process 507. At this juncture, the variables Sxy and Cxy represent the following values:

$$Sxy = \sum_{i=1}^{n} (Dxy(i) \times \mathrm{SIN}(i)),$$

-continued $$Cxy = \sum_{i=1}^{n} (Dxy(i) \times \cos(i))$$

In the process 507, the candidate particle coordinate counter xy for measuring the length of the speckle interference fringe particles is reset to calculate the initial phase of the speckle interference fringe particles in the process 508 as follows:

$$\phi xy = arc\,TAN\,(Sxy/Cxy)$$

In the process 509, whether the calculated initial phase $\phi xy$ in the process 508 is 0° on the physical window (this term is sometimes used hereinafter as a more general term for "spatial filter") 12 or not is determined. If it is YES, they are stored in the process 510 as the speckle interference fringe particles having its initial phase of 0°. If it is NO, the sequence will proceed to the process 511. By the process 511, whether the initial phase $\phi xy$ calculated in the process 508 is 90° on the physical window 13 or not is determined. If the determination made in the process 511 is YES, they will be stored in the process 512 as the speckle interference fringe particles having its initial phase of 90°. The sequence following the process 510 and process 512 as well as the sequence following the determination in the process 512 which has been made as NO will proceed to the process 513 to count up the candidate particle coordinate counter xy for measuring length. Then, in the process 514, whether the candidate particles for measuring length are completed counting or not is determined. If it is NO, the sequence will return to the process 508 to repeat a cycle of from the process 508 to the process 513. If it is YES, the sequence will exit from the selection routine by the application of the phases of the speckle interference fringe particles. With the sequence as above, the selection is made for the speckle interference fringe particles having the phase difference of 90° on the physical windows 12 and 13.

Subsequently, the coordinate window, corresponding to the speckle interference fringe particles stored in the physical window 12 in the process 510 as having initial phase of 0°, is designated to be opened in the process 404. Likewise, the coordinate window, corresponding to the speckle interference fringe particles stored in the physical window 13 in the process 512 as having initial phase of 90°, is designated to be opened in the process 405. Then, in the process 406, the window thus instructed to be opened will be opened by means of the air filter controller 16 and the other windows will be closed. Hence, the required preliminary preparations as a speckle length measuring instrument has been completed to enable the apparatus to function as a length measuring instrument. The light receiving elements 14 and 15 serve to transduce the variation of the amounts of light into the variation of the electric signals, and the electric signals output from the light receiving elements 14 and 15 are changed by the shifting of the measuring surface 10. Since the physical windows 12 and 13 have been opened by selecting the speckle interference fringe particles having the phase deviation at an angle of 90° to each other, the phases of the electric signals from the light receiving elements 14 and 15 are also deviated from each other at an angle of 90°. For example, if the electric signal from the light receiving element 14 is of a sin wave, the electric signal 15 from the light receiving element is also of a sin wave having its phase deviated at an angle of 90° against the sin wave. The following signal processing will be a general one whereby to produce the up and down pulses from two signals. The electric signals from the light receiving elements 14 and 15 enter the interpolation circuit 19 through the buffering amplifiers 17 and 18. In the interpolation circuit 19, intermediate phases are further produced from the two electric signals having the deviated phases at an angle of 90° to enable the enhancement of resolution. Then, in the subsequent pulse circuit 20, they are converted into pulse signals to produce the up and down pulses by determining the shifting direction of the measuring plane by means of the direction distincting circuit 21. The up and down pulses output from the direction distincting circuit 21 are measured by the counter 22 to display numerical values on the display 23 as the shifting amounts of the measuring surface. While functioning as an instrument for measuring length, the system controller 26 executes the sequence from the process 406 to the process 410. In the process 407, the speckle interference fringe particles selected in the process 403 are traced to determine whether the designation to open the physical windows 12 and 13 designated by the shifting of the speckle interference fringe particles is changed or not is to be determined in the process 408. If it is YES, the window opening designation is changed in the process 409 and the sequence will return to the process 406 thereby to open a window which is newly designated while closing the window for which the window opening designation has been released. At this juncture, the numbers of the windows to be opened and closed are the same and its opening and closing are simultaneously executed. If the determination made in the process 408 is NO, whether the tracing of the speckle interference fringe particles selected in the process 410 is completed or not is determined. If it is NO, the sequence will return to the process 407 to continue the processes. If it is YES, the sequence will be completed. In other words, the operations to enable the apparatus to function as an instrument for measuring length will be terminated.

The area sensor 28 adopted here is an sensor capable of grasping the changes of the amounts of light on the plane positional coordinate and at such a point as a CCD which is used for receiving images.

In this respect, it may be possible to conduct the measurement of the initial phase only for the preliminary preparation for the length measurement, and it is good enough only if the outputs and processes can follow the light and shade changes in the interference fringe when the reference surface 11 is being shifted. Also, since the tracing of the speckle interference fringe particles is comparably slower as compared with the shifting of the measuring plane in the direction of the optical axis, it may be possible to adopt a sensor actuating by a slower processing velocity such as a CCD.

Although one need only select one speckle interference fringe particle by means of each of the physical windows 12 and 13, the incident amounts of light to the light receiving elements 14 and 15 will be increased by selecting a plurality of the particles for each of them. Thus, as a result of the averaging effects, they can be intensified against external distrubances and noises.

Also, in the above-mentioned embodiment of the selection sequence for the speckle interference fringe particles, the description has been made while defining the initial phases of the particles to be selected as 0° and 90° but this is only one example, and it will suffice only if there is the respective phase difference of 90° in the physical windows 12 and 13. Therefore, the resultant difference can be 90°, there is no problem at all even if the phase angles are other than 0° and 90°.

The above-mentioned selection sequence for the speckle interference fringe particles and the tracing sequence for the speckle interference fringe particles are controlled by the system controller 26. In FIG. 2, although each individual particle of the speckle interference fringe particles is represented as a small interference fringe, a large interference fringe should appear if the measuring surface is of a mirror surface. In this case, too, it is possible to use the above-mentioned systems and sequences without any problem only if the physical windows are arranged accordingly even when the speckle interference fringe patterns become extremely large. Likewise, the present embodiment is also applicable to the metallic surface or glossy surface of a half mirror.

Figure 7:
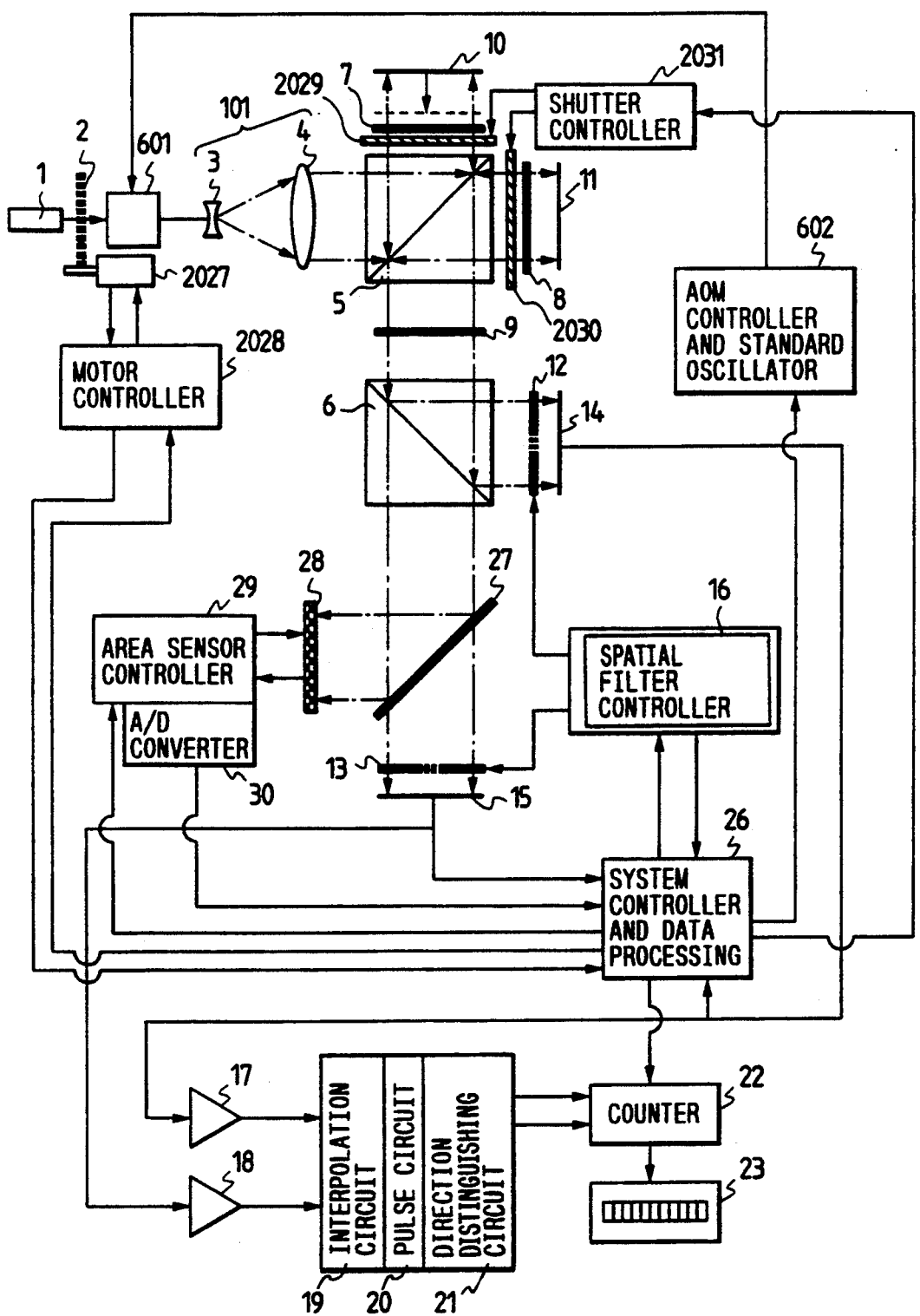
FIG. 7 is a view schematically showing the principal portion of embodiment 4 according to the present invention.
Figure 8:
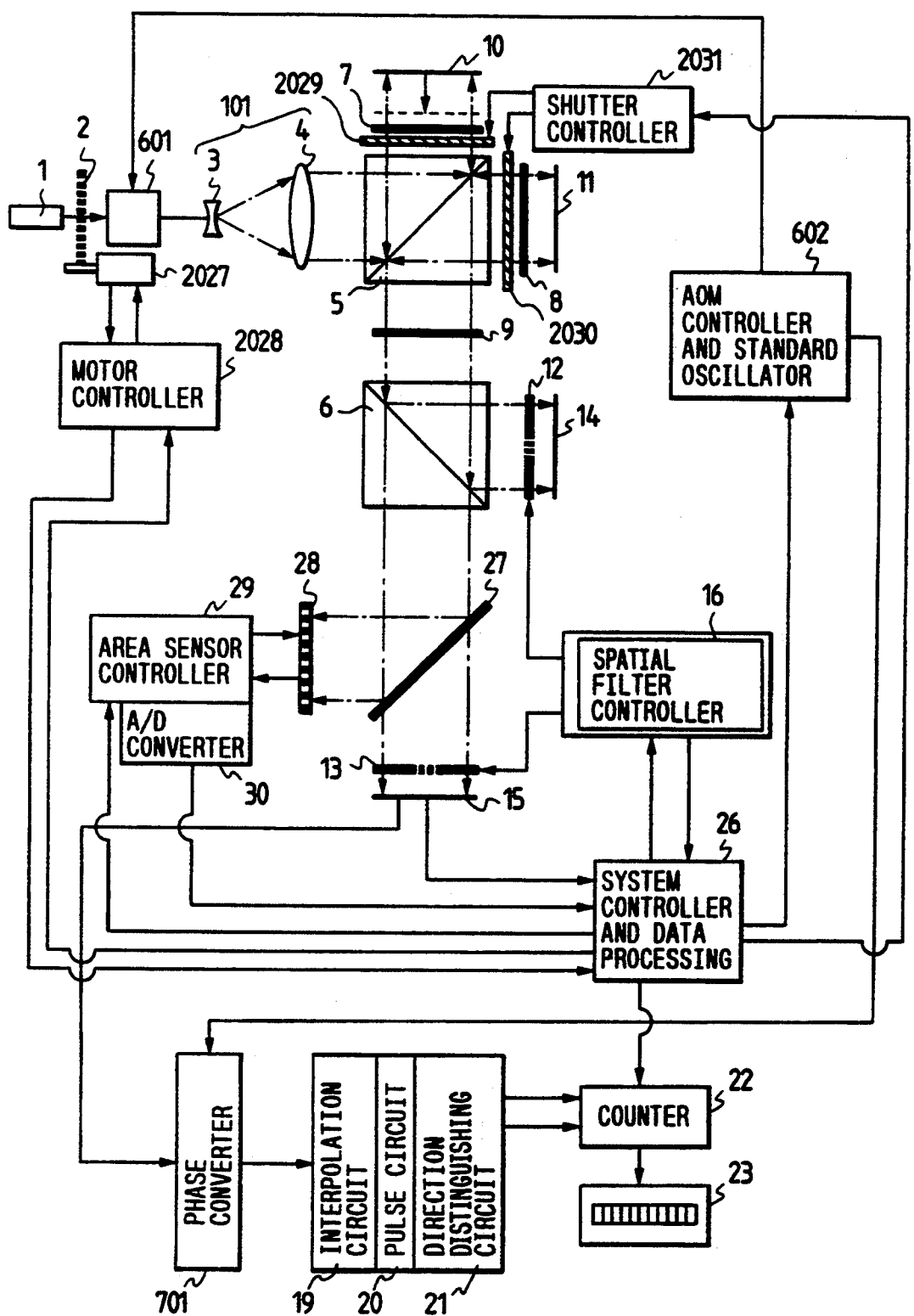
FIG. 8 is a view schematically showing the principal portion of embodiment 5 according to the present invention.
Figure 9:
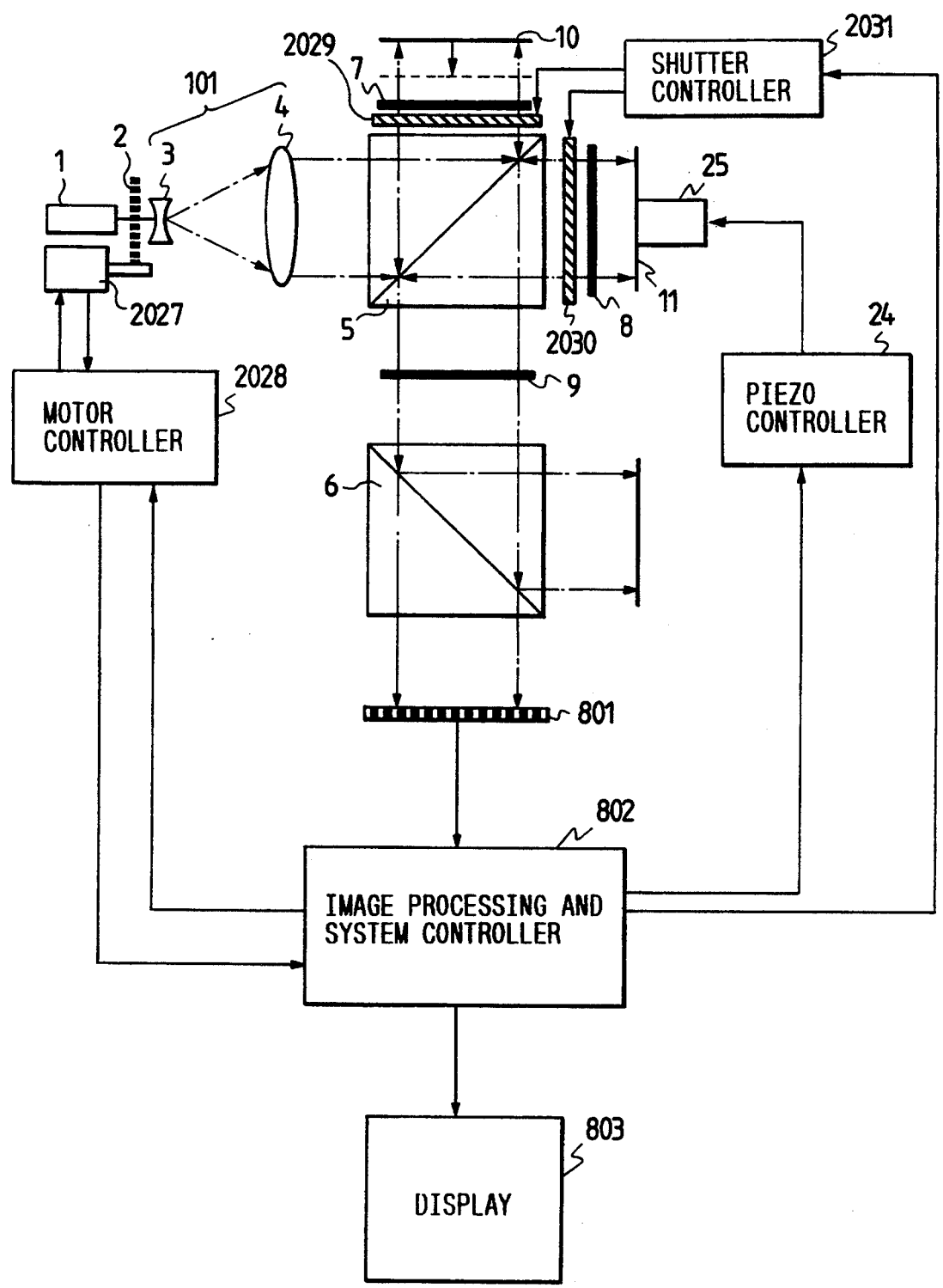
FIG. 9 is a view schematically showing principal portion of the embodiment 6 according to the present invention.

FIG. 7, FIG. 8 and FIG. 9 are views schematically showing the principal parts of embodiments 4, 5 and 6, respectively. In FIG. 7, FIG. 8 and FIG. 9, the same reference numerals used in FIG. 4 are provided for the same elements as those appearing therein.

In embodiment 4 in FIG. 7, a reference numeral 601 designates an AOM frequency shifter and 602, an AOM shifter controller. In this embodiment, instead of the method for mechanically shifting the reference surface 11 according to embodiment 3 shown in FIG. 4, the AOM frequency shifter 601 is employed as means for giving changes in the one cycle portion of the interference fringes by the selection method using the phase difference of the speckle interference fringe particles thereby to produce a laser light having the two frequencies with the polarized light planes having a given frequency difference, which are orthogonal to each other, and to irradiate the respective rays of light onto the measuring surface 10 and reference surface 11 so that they are interfered with each other. Thus, the method for obtaining the signals which vary per cycle of the interference fringe by the difference between the two frequencies is used. This is the only point which differs from embodiment 3, and the other structures are substantially the same.

For embodiment 5 shown in FIG. 8, the method for receiving the signals for measuring length in embodiment 4 in FIG. 7 is replaced with an optical heterodyne method. In FIG. 8, a reference numeral 701 designates a phase transducer for converting the amounts of optical frequency shift into phase difference signals. In FIG. 8, as in embodiment 3, the signals from the speckle interference fringe particles having the same phase selected by the physical window 13 become the signals given as below. In other words, given the frequencies of the laser light having the two frequencies having the polarized light planes orthogonal to each other, which are emitted from the AOM frequency shifter 601, as f1 and f2, at the same time, it being assumed that the laser light of the frequency f1 is irradiated onto the measuring plane 10 and that of f2, onto the reference surface 11, the f1 will generate a Doppler frequency shift $\Delta f1$ when the measuring plane 10 is shifted at that time and the frequency becomes $f1\pm\Delta f1$. Then, if this is interfered with the reflected light f2 from the reference surface 11, the frequency becomes a signal of $(f2-f1)\pm\Delta f1$. This signal of frequency $(f2-f1)\pm\Delta f1$ is detected on the light receiving element 15 as electric signal because only the light from the speckle interference fringe particles having the same phase are allowed to pass the physical window 13. The electric signal $(f2-f1)\pm\Delta f1$ from the light receiving element 15 enters the phase transducer 701 together with the fiducial signal $(f2-f1)$ from a fiducial oscillator 602 and then the frequency shift signals are converted into a phase difference signal. The following processes will be executed as in the embodiment 3 and the shifting amounts of the measuring plane 10 are digitized to be displayed on the display 23.

Embodiment 6 shown in FIG. 9 has the same fundamental constitution as embodiment 3 shown in FIG. 4 with the exception in that the selection of the speckle interference fringe particles is attempted by an image processing which will be executed by software in place of the selection using the physical windows.

In FIG. 9, a reference numeral 801 designates an area sensor; 802, a controller for operating image processing and data processing; and 803, a display.

In embodiment 6 in FIG. 9, the image processing is performed by a software instead of the operation of the physical windows to process the phase signal changes due to the shift of the measuring plane 10.

As described above, in embodiments 3 to 6, the speckle interference fringe particles are selected, and the physical windows comprising spatial filters are opened and closed in response to the foregoing speckle interference fringe particles selected, thus drawing the signals having phases deviated at an angle of 90° to make it possible to obtain the phase information of the speckle interferometer simply by the conventional signal processing circuits without provisions of any special light receiving elements and complicated devices for processing signals. Furthermore, by providing a function to change the physical windows following the shift of the speckle interference fringe particles thus selected, it is possible to utilize them as an instrument for measuring length to measure the shifting amounts of the surface of an object. Also, it is possible to execute such processes at high speeds. Moreover, the systems according to the embodiments of the present invention have such a particular effect among many others that they can perform the measurements even when the target surface is a specular or glossy plane despite the fact that speckles do not usually appear unless the target surface is rough.

Figure 10:
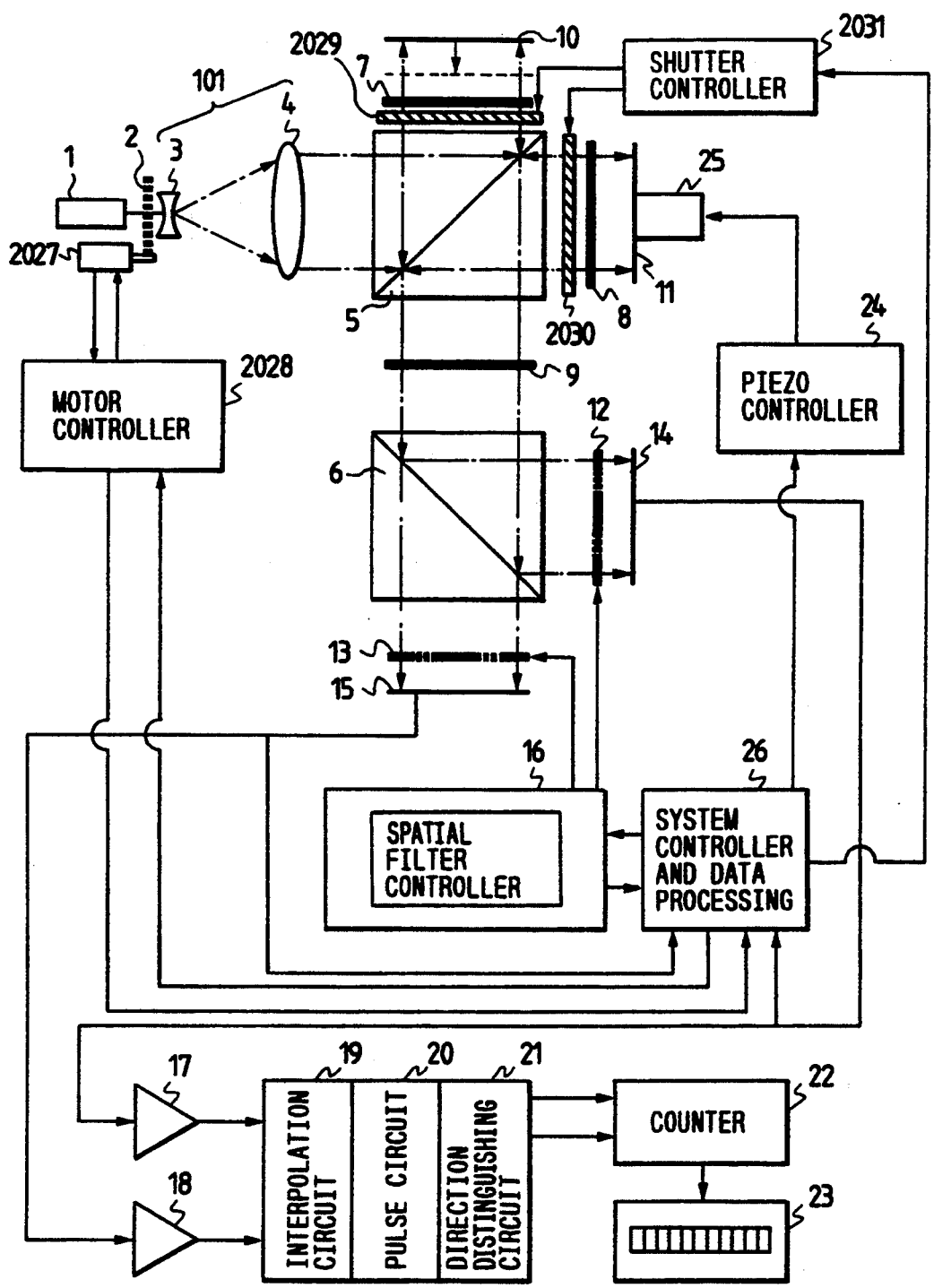
FIG. 10 is a view schematically showing the principal portion of embodiment 7 according to the present invention.

FIG. 10 is a view schematically showing embodiment 7 according to the present invention.

In FIG. 10, the same reference numerals as in FIG. 4 are provided for the elements which are the same as those appearing therein.

In the present embodiment, what differs from the embodiment 1 shown in FIG. 1 is that the ratio of the amounts of light of the reflective rays from the measuring surface 10 and reference surface 11 is wade automatically and arbitrarily adjustable by arranging the structure so that a ½ wavelength plate 2 can be rotated by instructions from the system controller 26. The other constitutions are fundamentally the same.

Now, although partially repetitive with the description of embodiment 3 shown in FIG. 4, the constitutional feature of the present embodiment will be described. In FIG. 10, each of the elements designated by numerals 1 to 26, 2027, 2028, 2029, 2030 and 2031 is the same as the one shown in FIG. 4.

Figure 11:
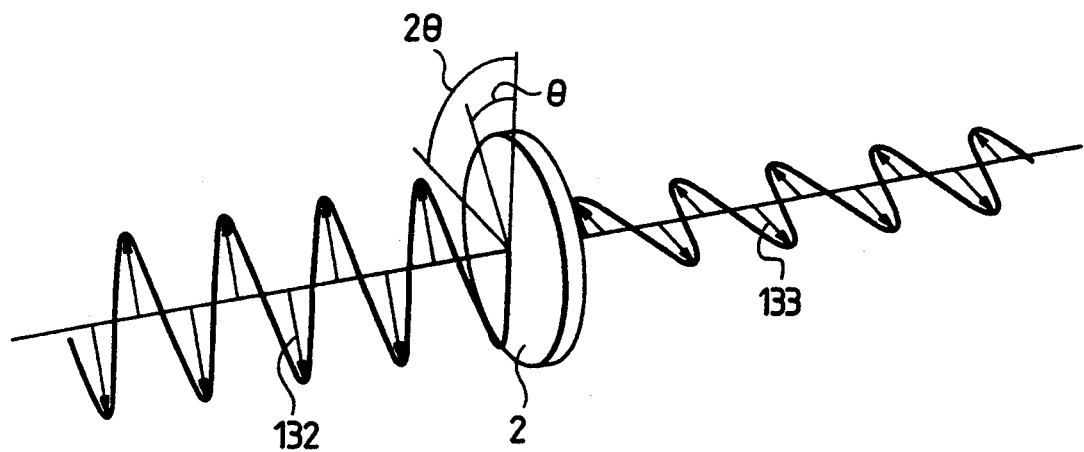
FIG. 11 is a view for explaining a part shown in FIG. 10.

In the present embodiment, the linearly polarized coherent light emitted from the laser 1 is expanded by the lenses 3 and 4 to be parallel rays of light through the $\lambda/2$ plate 2. The laser beam is divided into two by the polarized light beam splitter 5, and one of them is irradiated onto the measuring plane 10 while the other, onto the reference surface 11. The $\lambda/2$ plate 2 operates to rotate around the optical axis to enable the polarized light plane of the vertically incident and linearly polarized light to be rotated; thus the rotational angle of the polarized light plane becomes by twice the rotational angle of the $\lambda/2$ plate 2. FIG. 11 illustrates such a state. In FIG. 11, reference numeral 32 designates the polarized light plane of the incident light; 33, the polarized light plane of the transmitting light; $\theta$, the rotational angle of the $\lambda/2$ plate 2; and $2\theta$, the rotational angle of the polarized light plane 33 of the transmitting light.

Now, an example is shown for balancing the amounts of light. At first, the rotational angle of the $\lambda/2$ plate 2 is defined as 0° and the rotational angle of the polarized light plane of the laser light is also defined as 0° when the polarized light plane of the laser light is adjusted so as to allow all the incident light to the polarized light beam splitter 5 to be transmitted therethrough to reach the reference surface 11. At this juncture, the $\lambda/2$ plate 2 is rotated 22.5° to rotate the polarized light plane of the laser 45° so as to cause substantially the same amounts of light to be irradiated onto the measuring surface 10 and reference surface 11. Then, the rotational angle of the $\lambda/2$ plate 2 is read by the encoder 2027 for data processing 26 by means of the motor controller 2028. While the angles to be rotated are not necessarily accurate, the number of rotations must be read by the encoder 2027 accurately. The rotational angle read at this juncture is given as $\theta 1$. Then, the shutter 2029 is closed and the shutter 2030 is opened so that only the amount of light reflected from the reference surface 11 is read by the light receiving elements 14 and 15 in the data processing 26. The amount of light at this juncture is given as P1. This time, the shutter 2030 is closed and the shutter 2029 is opened on the contrary to enable the amount of light reflected from the reference surface 11 to be read by the light receiving elements 14 and 15 in the data processing 26. The amount of light at this juncture is given as P2. Also, simultaneously, the rotational angle of the $\lambda/2$ plate 2 is read and is given as $\theta 2$. Now, given the reflectivity of the reference surface 11 as R1, the reflectivity of the measuring plane 10 as R2, and the total amount of incident light from the laser to the polarized light beam splitter 5 as S, their relationships will be as follows:

$$\frac{S \times R1 \times \cos^2(2 \times \theta 1)}{2} = P1, \quad (1)$$

$$R1 = \frac{2 \times P1}{S \times \cos^2(2 \times \theta 1)}$$

$$\frac{S \times R2 \times \sin^2(2 \times \theta 2)}{2} = P2, \quad (2)$$

$$R2 = \frac{2 \times P2}{S \times \sin^2(2 \times \theta 2)}$$

Then, given the rotational angle of the $\lambda/2$ plate 2 as $\theta x$ when the amounts of light P1 and P2 become equal, the relationship will be as follows:

$$\frac{S \times R1 \times \cos^2(2 \times \theta x)}{2} = \frac{S \times R2 \times \sin^2(2 \times \theta x)}{2} \quad (3)$$

Now, if equations (1) and (2) are substituted into equation (3), the result will be as follows:

$$\text{TAN}^2(2 \times \theta x) = \frac{P1 \times \sin^2(2 \times \theta 2)}{P2 \times \cos^2(2 \times \theta 1)}$$

Thus, the rotational angle $\theta x$ of the $\lambda/2$ plate 2 can be obtained by the following equation:

$$\theta x = \text{TAN}^{-1} \frac{\left( \sqrt{\frac{P1 \times \sin^2(2 \times \theta 2)}{P2 \times \cos^2(2 \times \theta 1)}} \right)}{2}$$

These calculations are executed by the data processing 26 to instruct the motor controller 2028 for the rotation of the $\lambda/2$ plate 2 to the angle $\theta x$ obtained as result of the calculation, hence enabling the $\lambda/2$ plate 2 to be rotated to the angle $\theta x$ by means of the motor 2027 having the encoder. Lastly, the shutter 2029 and shutter 2030 are opened. Now, the balancing of the amounts of light is completed. The above-mentioned sequence for balancing the amounts of light is automatically executed by the instructions from the system controller 26.

Figure 12:
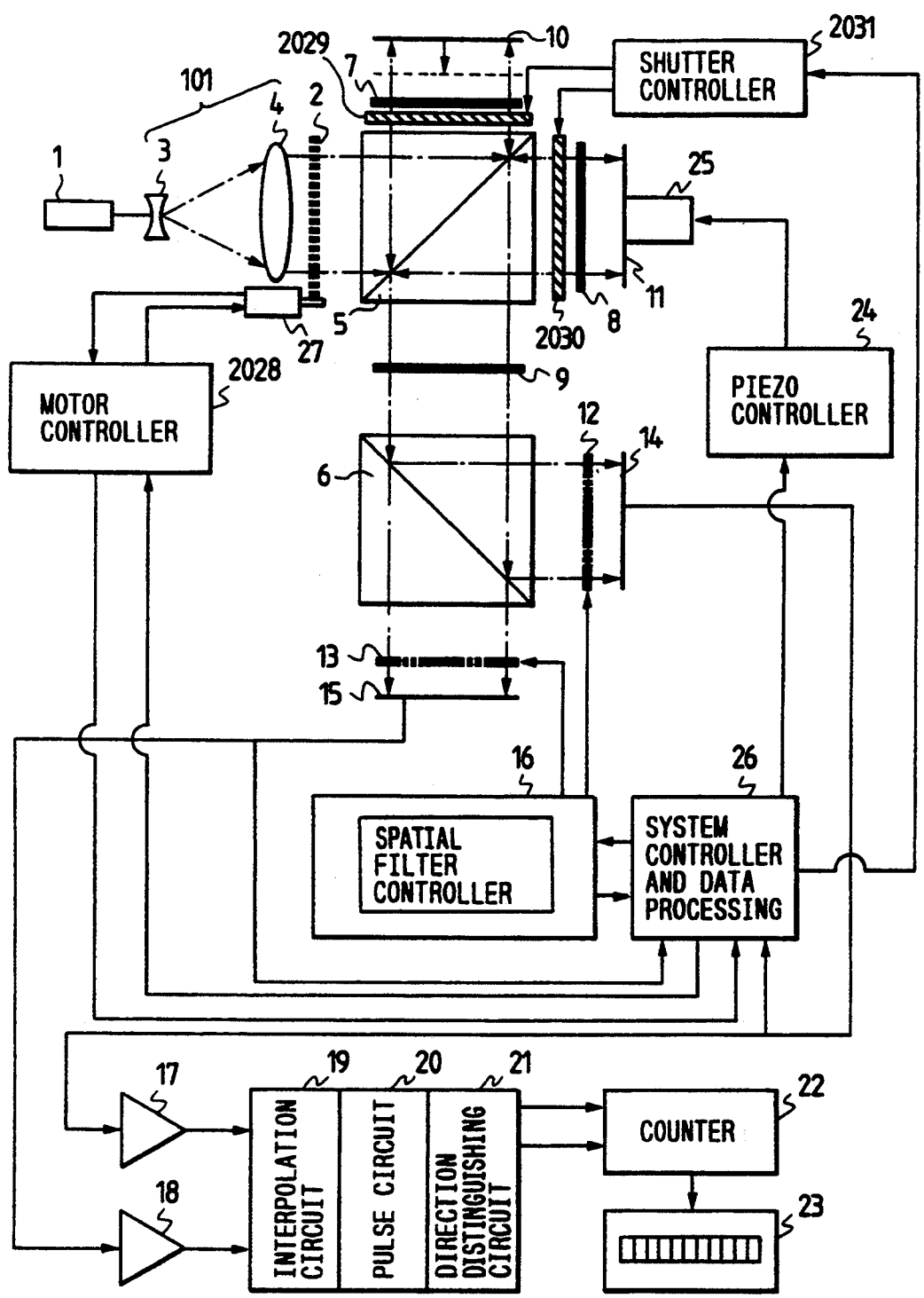
FIG. 12 is a view schematically showing the principal portion of embodiment 8 according to the present invention.

FIG. 12 is a view schematically showing the principal part of embodiment 8 according to the present invention.

In the present embodiment, what differs from the embodiment 7 shown in FIG. 10 is that the $\lambda/2$ plate 2 is arranged between the beam expander 101 and polarized light beam splitter 5 instead of being arranged between the light source 1 and beam expander 101. The other constitutions are fundamentally the same.

Also, in the present embodiment, it is possible to obtain the same effects as in the foregoing embodiment 7 by arranging the $\lambda/2$ plate 2 between the lens 3 and lens 4 which constitute the beam expander 101.

As described above, according to the embodiments 7 and 8, the wavelength plate ($\lambda/2$ plate) corresponding to a ½ of the light wavelength that the optical phase difference uses is inserted in the optical path between the polarized light beam splitter 5 for dividing the light for the measuring surface 10 and reference surface 11, and the light source 1. Then, there is provided a mechanism whereby to adjust steplessly the ratio of the amounts of light branched by the polarized light beam splitter to be directed toward the measuring surface 10 and reference surface 11 by rotating this wavelength plate to cause the polarized light plane to be rotated. Thus, the rotational angles of the $\lambda/2$ plate are automatically adjusted so as to balance the amounts of the reflected light from the measuring plane 10 and reference surface 11 equally to make it possible to enhance the contrast of the interference fringes sufficiently.

As a result, the ratio between the output electric signals of the speckle interferometer and noises becomes greater, hence enabling one to improve the measurement precision. There is also no need for the arrangement of any ND filters for balancing the amounts of light for the reference surface 11 and measuring surface 10 among other effects.

In this respect, it may be possible to for example use a TN liquid crystal, to rotate the polarized light plane in place of the $\lambda/2$ plate.

Figure 13:
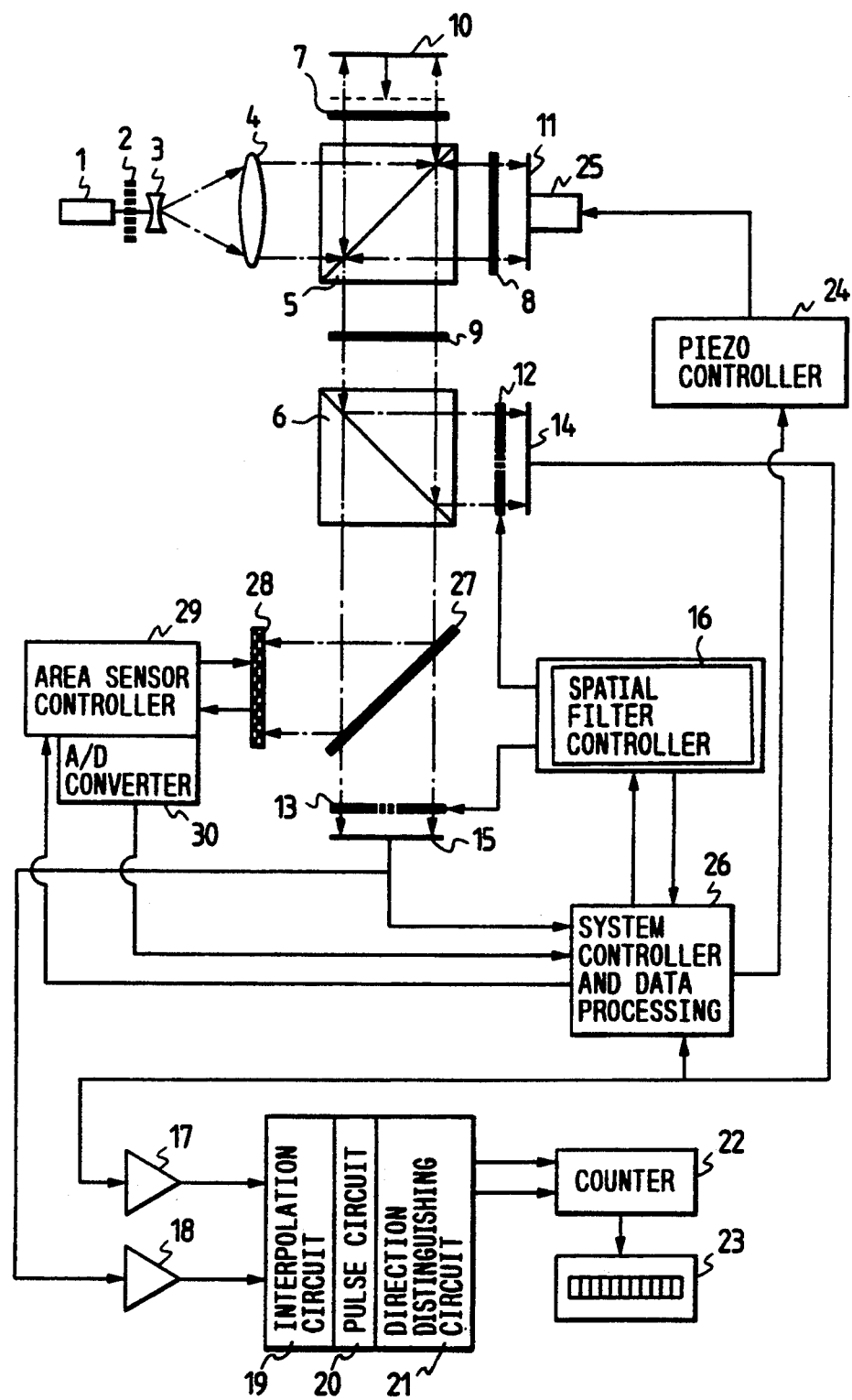
FIG. 13 is a view schematically showing the principal portion of embodiment 9 according to the present invention.

FIG. 13 is a view schematically showing the principal part of embodiment 9 according to the present invention.

In FIG. 13, the same reference numerals as used in FIG. 1 are provided for the elements which are the same as those appearing therein.

In the present embodiment, what differs from embodiment 1 shown in FIG. 1 is that the reference surface 11 is shifted from the light source 1 for an amount of approximately ½ of the wavelength of the light beam in the direction of the optical axis, and at this juncture, the light and shade changes in the speckle interference fringe particles are detected by the area sensor to measure the initial phase of each individual particle of the speckle interference fringe particles. The other structures are fundamentally the same.

In FIG. 13, each of the elements designated by numerals 1 to 26 are the same as those shown in FIG. 1.

In FIG. 13, a reference numeral 27 designates a half mirror; 28, an area sensor for measuring the initial phases of the interference fringes of the speckle particles; 29, an area sensor controller for actuating the area sensor 28; and 30, an A/D converter for converting the analogue output from the areas sensor into the digital one.

In the present embodiment, the linearly polarized coherent light emitted from the laser 1 is expanded by the lenses 3 and 4 through the λ/2 plate 2 to become parallel rays of light. By the polarized light beam splitter 5, the power ratio between the reflecting light and transmitting light is changed by the rotational angles of the λ/2 plate 2 which rotates around the optical axis. The reflected light from the polarized light beam splitter 5 is irradiated onto the measuring surface 10 through the λ/4 plate 7. The scattering rays of light reflected at the diffusion surface of the measuring plane 10 pass through the λ/4 plate 7 again to be transmitted through the polarized light beam splitter 5.

Of the incident rays of light to the polarized light beam splitter 5 as parallel rays of light from the lenses 3 and 4, the transmitting light passes through the λ/4 plate 8 to be reflected at the reference surface 11 and transmits the λ/4 plate 8 again. This time, it is reflected by the polarized light beam splitter 5 to get together with the light from the measuring surface 10. The rays of light from the measuring surface 10 and reference light from the reference surface 11 which get together at the polarized light beam splitter 5 pass through the λ/4 plate 9 to be divided into by the polarized light beam splitter 6 two directions for representing the speckle interference fringe patterns respectively on the air filters 12 and 13 having one or a plurality of physical windows.

Here, as the spatial filters 12 and 13, the matrix type liquid crystal shutters 32 and 35 shown in FIG. 2 can be considered. In FIG. 2, reference numerals 31 and 34 designate the speckle interference fringe patterns formed with a plurality of speckle interference fringe particles, which are represented on the liquid crystal shutters 32 and 35; and 33 and 36 in FIG. 2, the representations of the speckle interference fringe patterns selected by the liquid crystal shutters 32 and 35 in FIG. 2. In this case, at least on one of the optical paths of the light divided into two optical paths by the polarized light beam splitter 6, the half mirror 27 is arranged to represent on the area sensor 28 the same speckle interference fringe patterns as those represented on the spatial filter 12 or 13. The spatial filters 12 and 13 open and close its windows in accordance with the instructions by the spatial filter controller 16 which controls the opening and closing of the windows of the filters to select those of the speckle interference fringe patterns which are allowed to be transmitted therethrough to reach the light receiving elements 14 and 15. The speckle interference fringe patterns selected here are those having the phases which are the same on the spatial filters 12 and 13 respectively but are deviated at an angle of 90° to each other on the filters 12 and 13. Now, given the speckle interference fringe patterns on the spatial filter 12 as 31 in FIG. 2, the liquid crystal shutter 32 as the spatial filter 12, the speckle interference fringe patterns on the spatial filter 13 as 34, and the liquid crystal shutter 35 as the spatial filter 13, the relationship between the speckle interference fringe patterns 33 and 36 selected respectively corresponds to the phase deviation of 90°.

The speckle interference fringe patterns 31 on the spatial filter 12 and the speckle interference fringe patterns 34 on the spatial filter 13 are the patterns having the phase difference of 180° from the beginning because their relationship is such as the one between the light reflected by and the light transmitted through, the polarized light beam splitter 6, respectively.

As an example of the method for selecting speckle interference fringe patterns, the reference surface 11 is shifted for a portion of λ/2 in the direction of the optical axis to measure the initial phase of each individual particle of the speckle interference fringe patterns by the area sensor 28. In order to implement this, the piezoelectric element 25 is actuated by the instructions by the piezocontroller 24, at first, and then the reference surface 11 is shifted for a portion of λ/2 in the direction of the optical aixs. At this juncture, the speckle interference fringe patterns generate light and shade changes for one cycle portion, respectively. The changes are grasped by the area sensor 28 as analogue electric signals which are divided into n sectors equally by the A/D converter 30 in the direction of the time axis and are transferred to the data processing 26 as digital signals. Thus, by one measurement, it is possible to obtain the data on the light and shade changes for one cycle portion divided into n sectors equally for each of the total speckle interference fringe patterns represented on the area sensor 28.

Subsequently, in the data processing 26, the phases of the respective speckle interference fringe patterns are calculated on the basis of the data drawn. The method for such a calculation will be described as follows:

At first, given data on one speckle light and shade changes of the total speckle interference fringe patterns as D(i) and the data arrays of the numerical values produced in the data processing 26 by dividing one cycle of SIN and COS into equal n sector as SIN(i) and COS(i), the phase $\phi$ of the speckle interference fringe patterns in this case can be obtained by executing the following equation in the data processing 26:

$$\phi = TAN^{-1}\left(\sum_{i=1}^{n} (D(i) \times SIN(i)) / \sum_{i=1}^{n} (D(i) \times COS(i))\right)$$

By applying this to the total speckle interference fringe patterns drawn by the area sensor 28 for calculation, it is possible to select a plurality of the speckle interference fringe patterns of the same phases or the phases deviated at an angle of 90°. If the coordinates of the area sensor 28 and the position of each individual shutter of the spatial filters 12 and 13 are arranged correspondingly in advance, it is possible to determine in accordance with the results of the calculation of the data from the area sensor 28 the speckle interference fringe patterns to be selected, that is, the shutters of the spatial filters 12 and 13.

The sensor 28 applied herein is a sensor capable of grasping changes in the amounts of light on the plane of coordinating positions like a CCD. The measurement of the initial phase is conducted only once at the beginning. It is also good enough only if the output and processing can follow the light and shade changes in the interference fringes when the reference surface 11 is shifted by a portion of $\lambda/2$. Therefore, a sensor such as a CCD actuating with a slow processing velocity is adoptable.

The speckle interference fringe patterns to be selected by the spatial filters 12 and 13 can be only one for each, but by selecting a plurality of them, the incident amounts of light to the light receiving elements 14 and 15 are increased so that they will be intensified against external disturbances and noises by its averaging effect.

The above-mentioned selection sequence for the speckle interference fringe patterns is controlled by the system controller 26.

The light receiving elements 14 and 15 operate to transduce the variation of the amount of light into the variation of electric signals. The electric signals output from the light receiving elements 14 and 15 are varied by the shifting of the measuring surface 10. The electric signals are also caused to have the phases deviated at an angle of 90° because the rays of light having phases deviated at an angle of 90° from each other are transmitted through the air filters 12 and 13. For example, if the electric signal from the light receiving element 14 is of a sine wave, the electric signal from the light receiving element 15 is of a sine wave having its phase deviated at an angle of 90°. The following processes will be a general process such as producing up and down pulses from two signals. The example will be given as below.

The electric signal from the light receiving element 14 or 15 enters the interpolation circuit 19 through the buffer amplifier 17 or 18. In the interpolation circuit 19, intermediate phases are further produced from the two electric signals having phases deviated at an angle of 90° to serve for the enhancement of resolution. Then, by the subsequent pulse circuit 20, they are converted into pulse signals and then in the direction distincting circuit 21, the shifting direction of the measuring plane is discriminated to produce up and down pulses. The up and down pulses output from the direction distincting circuit 21 are measured by the pulse counter 22 to be displayed on the display 23 as numerical values to represent the shifting amounts of the measuring plane.

Figure 14:
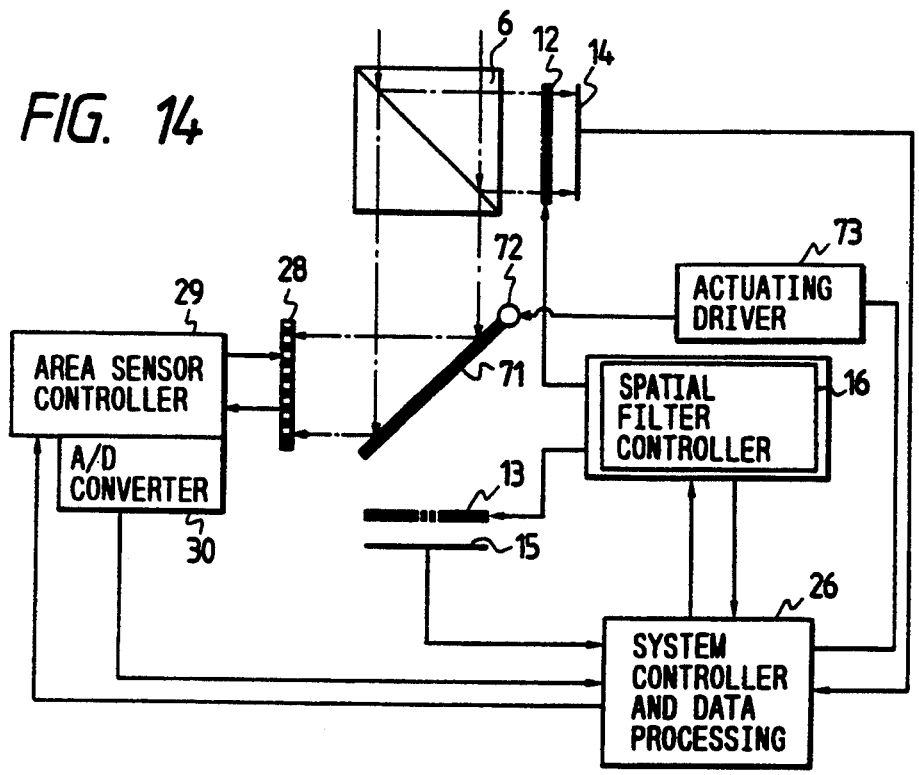
FIGS. 14 and 15 are views schematically showing the principal portion of embodiment 10 according to the present invention.
Figure 15:
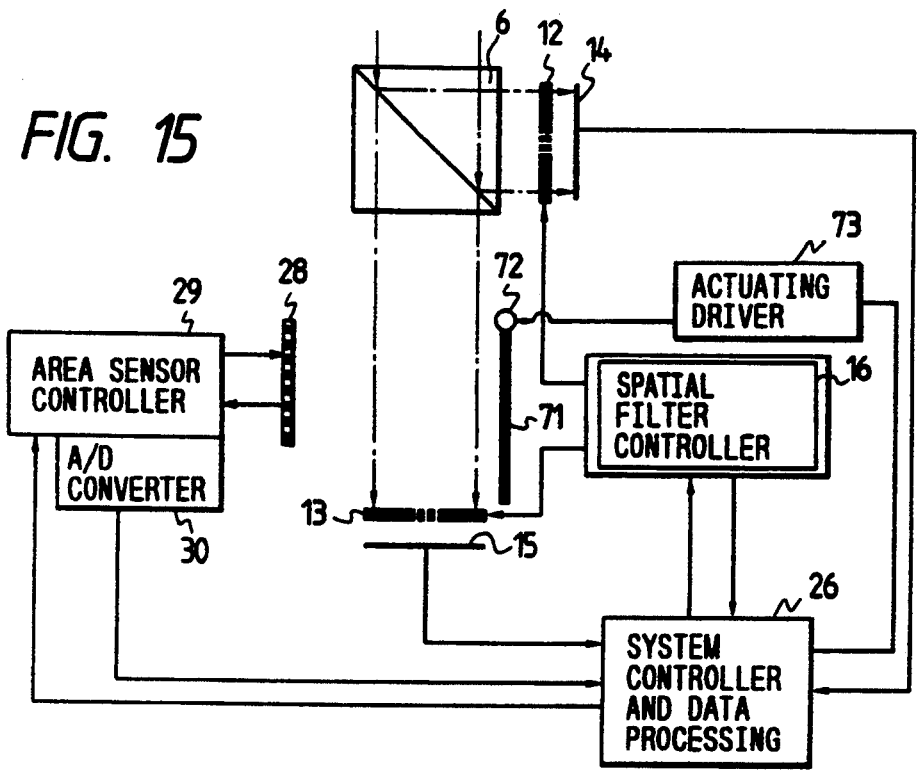
Figure 16:
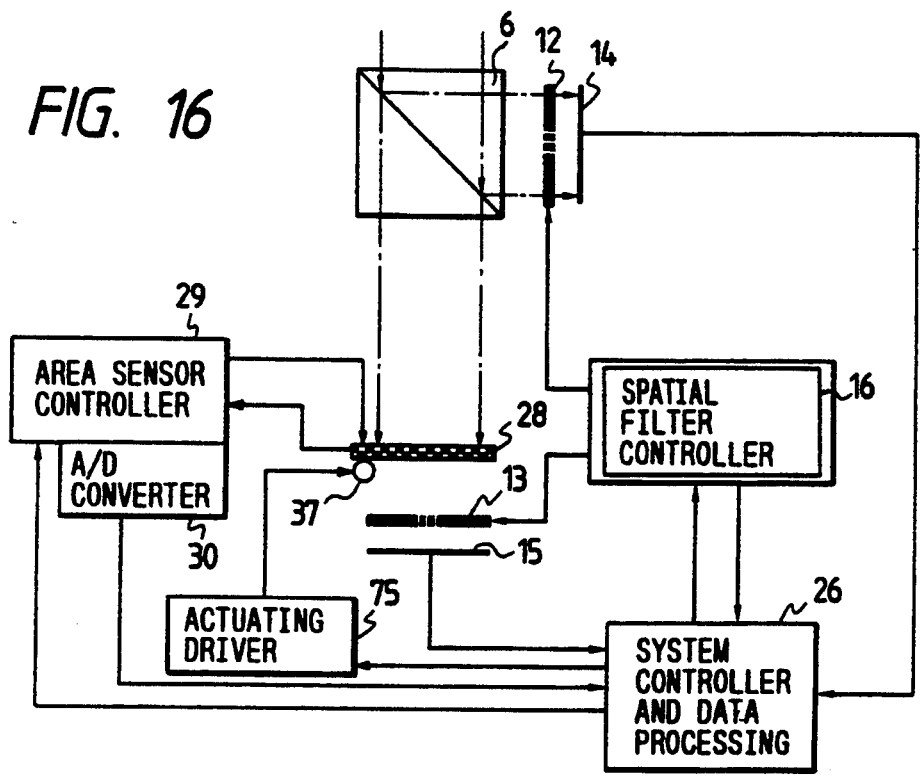
FIGS. 16 and 17 are views schematically showing the principal portion of embodiment 11 according to the present invention.
Figure 17:
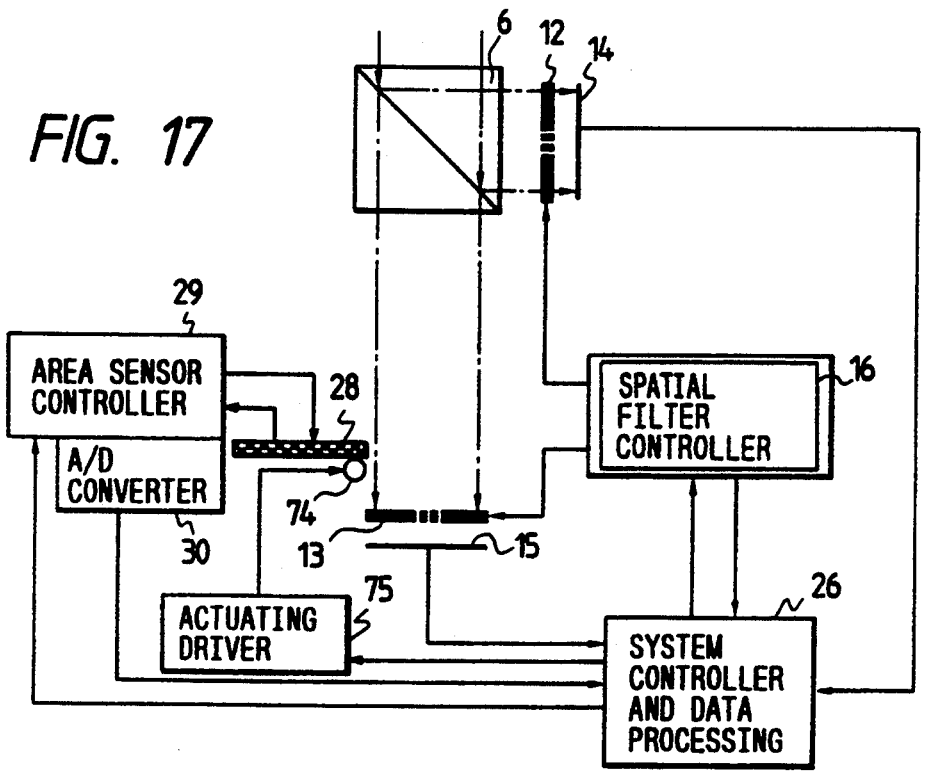

FIG. 14 and FIG. 15 are views schematically showing a part of embodiment 10 according to the present invention. FIG. 16 and FIG. 17 are views schematically showing a part of embodiment 11 according to the present invention.

In embodiments 10 and 11, what differs from embodiment 9 shown in FIG. 13 is that only the optical system for guiding the light beams from the polarized light beam splitter 6 to the area sensor 28 is different. The other structures are fundamentally the same.

For the embodiment 10 shown in FIG. 14 and FIG. 15, a movable mirror 71 is applied in place of the half mirror.

In FIG. 14 and FIG. 15, a reference numeral 71 designates a mirror; 72, an actuating device to actuate the mirror 71; and 73, a driver to actuate the actuating device 72. When the initial phases of the speckle interference fringe patterns are measured, light is guided to the area sensor 28 by means of the mirror 71 as shown in FIG. 14. When the signals are processed to measure the shifting amount of the measuring plane as an instrument for measuring length of the speckle interference system, light is guided to the spatial filter 12 or 13 by shifting the mirror 71 as shown in FIG. 15.

In embodiment 11 shown in FIG. 16 and FIG. 17, the half mirror is not used. Instead, the area sensor 28 is detachably arranged in the optical path.

In embodiment 11 shown in FIG. 16 and FIG. 17, a reference numeral 74 designates an actuating device to actuate the area sensor 28 and 75, a driver to actuate the actuating device 74. When the initial phases of the speckle interference fringe patterns are measured, light is received by the area sensor 28 as shown in FIG. 16. When the signals are processed to measure the shifting amount of the measuring plane as an instrument for measuring length of the speckle interference system, light is guided to the spatial filter 13 or 12 by shifting the area sensor 28 as shown in FIG. 17.

In this respect, the signal process, sequence and calculation process, and others in embodiments 10 and 11 are the same as those in embodiment 9.

As described above, in embodiments 9, 10 and 11, the spatial filters having physical windows corresponding to the speckle interference fringes are arranged to draw the signals of the phases which are deviated at an angle of 90°, hence making it possible to easily draw the phase information regarding the speckle interferometers by means of the conventional signal processing circuits without any particular light receiving elements and complicated signal processing devices. The system can be utilized as an instrument for measuring length to measure the shift of an object. There is also an effect that such processes can be executed at high speed.

According to the present invention as set forth above, the spatial filters having windows for the speckle interference fringe patterns are arranged to draw the two signals of the phases which are deviated at an angle of 90°. Thus this invention makes it possible to draw the required phase information simply by means of the conventional signal processing circuits without any particular light receiving elements and complicated signal processing devices and to implement a speckle interference apparatus which can be utilized as an instrument for measuring length for measuring the shift information of the measuring plane with high precisions at high speed, for example.

What is claimed is:

1. A speckle interference apparatus comprising:
a light source;
light splitting and synthesizing means, said means splitting light from said light source into a plurality of partial light beams to direct at least one partial light beam to a measuring plane and at least one other partial light beam to a reference surface and synthesizing the partial light beam passed via said measuring plane and the partial light beam passed via said reference surface to produce speckle interference fringe patterns including areas of different phases with each other and areas of same phases with each other; and selecting means for selecting areas of same phases among said speckle interference fringe patterns for detection of light from the areas of same phases.

2. A speckle interference apparatus according to claim 1, wherein said light splitting and synthesizing means comprises a single member which performs both the splitting of the light from said light source and said light synthesizing.

3. A speckle interference apparatus according to claim 1, further comprising additional light splitting means for splitting light synthesized by said light splitting and synthesizing means into first and second partial light beams, and wherein said selecting means includes a first and a second selecting means for said first and second partial light beams, respectively.

4. A speckle interference apparatus according to claim 3, wherein the first and second speckle interference fringe patterns selected by said first and second selecting means have a phase difference at an angle of 90° to each other.

5. A speckle interference apparatus according to claim 1, wherein
said selecting means has means for shifting said reference surface for a portion of ½ wavelength of said light.

6. A speckle interference apparatus according to claim 1, wherein said selecting means has an AOM frequency shifter between said light source and said light splitting and synthesizing means.

7. A speckle interference apparatus according to claim 6, wherein
said apparatus has a phase transducer for converting frequency shift amounts into phase difference signals to detect length measuring signals by a heterodyne method.

8. A speckle interference apparatus according to claim 1, wherein said selecting means comprises image processing means and selects the areas of a same phase by means of computer software.

9. A speckle interference apparatus comprising:
a light source;
a first polarized light beam splitter for splitting light from said light source into a pair of polarized light beams having states of polarized light different from each other, to direct one of the light beams toward a measuring surface and the other toward a reference surface, as well as to synthesize both light beams through said measuring plane and said reference surface;
a phase plate, for producing speckle interference fringe patterns by causing the polarization states of both of said synthesized light beams to be matched;
a second polarized light beam splitter, splitting light of speckle interference fringe patterns into transmitting light and reflecting light;
a first spatial filter, sampling the speckle interference fringe patterns having same phases as each other from said transmitting light; and
a second spatial filter for sampling the speckle interference fringe patterns having same phases as each other from said reflecting light.

10. A speckle interference apparatus according to claim 9, wherein the phase difference between the speckle interference fringe patterns selected by said first spatial filter and the speckle interference fringe patterns selected by said second spatial filter is 90°.

11. A speckle interference apparatus according to claim 9, wherein said spatial filters comprise liquid crystal shutters.

12. A method for measuring speckle interference fringes, comprising the steps of:
emitting light;
splitting the light into a plurality of partial light beams to direct at least one of the partial light beams toward a measuring surface and at least one other partial light beam toward a reference surface;
synthesizing the partial light beam passed via the measuring surface and the partial light beam passed via the reference surface;
forming a pattern to produce speckle interference fringe patterns including areas of different phases with each other and areas of same phases with each other by causing states of polarized light of each of the synthesized partial light beams to be matched; and
selecting the areas having same phases among the speckle interference fringe patterns for detection of light from the areas of same phases.

13. A speckle interference apparatus comprising:
a light source;
light splitting means, said means splitting light from said light source into a plurality of partial light beams to direct at least one partial light beam to a measuring surface and at least one other partial light beam to a reference surface;
light synthesizing means for synthesizing said partial light beam passed via said measuring surface and said partial light beam passed via said reference surface to produce speckle interference fringe patterns including areas of different phases with each other and areas of same phases with each other;
selecting means, said means selecting the areas of same phases of the speckle interference fringe patterns for detection of light from the areas of same phases;
tracing means for tracing the shift positions of said selected speckle interference fringe; and
switching means for switching over the selection areas for said selecting means in accordance with said shift positions.

14. A speckle interference apparatus comprising:
a light source;
light splitting means, said means splitting light from said light source into a plurality of partial light beams to direct at least one partial light beam to a measuring surface and at least one of the other partial light beam to a reference surface;
light synthesizing means for synthesizing said partial light beam passed via said measuring surface and said partial light beam passed via said reference surface to produce speckle interference fringe patterns including areas of different phases with each other and areas of same phases with each other;
selecting means, said means selecting the areas of same phases of said the speckle interference fringe patterns for detection of light from the areas of same phases;
tracing means for tracing the shift positions of said selected speckle interference fringe; and
switching means for switching over the selection areas for said selecting means in accordance with said shift positions, wherein said selecting means is an air comprises a spatial filter having a plurality of windows capable of being opened and closed.

15. A speckle interference apparatus according to claim 14, wherein the windows are opened and closed by said switching means in equal numbers and simultaneously.

16. A speckle interference apparatus according to claim 13, wherein
said tracing means has an area sensor for measuring the initial phases of said speckle interference fringe patterns to read by said area sensor the shift positions of said speckle interference patterns.

17. A speckle interference apparatus comprising the following:
a light source;
a first polarized light beam splitter for splitting light from said light source into a pair of polarized light beams having states of polarized light different from each other, to direct one of the light beams toward a measuring plane and the other toward a reference surface, as well as to synthesize both light beams after going out from said measuring plane and said reference surface;
a phase board for producing speckle interference fringe patterns by causing the polarization states of both of said synthesized light beams to be matched;
a second polarized light beam splitter, splitting said light of speckle interference fringe patterns into transmitting light and reflecting light;
a first spatial filter for sampling the speckle interference fringe patterns having same phases as each other from said reflecting light;
a beam splitter for splitting said transmitting light into a first partial light beam and a second partial light beam;
a second spatial filter for sampling the speckle interference fringe patterns having same phases as each other from said first partial light beam;
an area sensor arranged in the optical path for the second partial light beam to measure the initial phases of a part of speckle interference fringe patterns; and
a spatial filter controller, said controller changing the sampling areas of each of said spatial filters in accordance with the shift positions of said speckle interference fringe patterns obtained on the basis of the information of said area sensor.

18. A speckle interference apparatus comprising the following:
polarized light emitting means;
light splitting means for splitting the polarized light from said polarized light emitting means into a pair of polarized light beams having states of polarized light different from each other, to direct one of them toward a measuring plane and the other toward a reference surface;
light synthesizing means for synthesizing the polarized light beam passed via said measuring plane and the polarized light beam passed via said reference surface to produce speckle interference fringe patterns including areas of different phases with each other and areas of same phases with each other;
selecting means for selecting the areas of a same phase of said speckle interference fringe patterns for detection of light from the areas of same phases; and
polarized light plane rotating means arranged in the optical path for said polarized light from said polarized light emitting means to rotate said polarized light to provide a given polarized light plane.

19. A speckle interference apparatus according to claim 18, wherein said polarized light plane rotating means comprises a half-wavelength optical phase plate.

20. A speckle interference apparatus according to claim 18, wherein
said polarized light plane is rotated by said polarized light plane rotating means so as to equalize the amount of the polarized light through said measuring surface and the amount of the polarized light through said reference surface.

21. A speckle interference apparatus comprising the following:
a light source;
a first light splitting means for splitting light from said light source into a plurality of partial light beams to direct at least one partial light beam toward a measuring surface and at least one other light beam toward a reference surface;
light synthesizing means for synthesizing said partial light beam passed via said measuring surface and said partial light beam passed via said reference surface to produce speckle interference fringe patterns including areas of different phases with each other and areas of same phases with each other;
a second light splitting means arrange to split light emitted from said light synthesizing means into a first and a second partial light beam;
selecting means arranged in the optical paths for said first and second partial light beams to select each of the areas having same phases among said speckle interference fringe patterns for detection of light from the areas of same phases; and
reference surface shifting means for shifting said reference surface for a given distance;
an area sensor, arranged in the optical path for said first partial light beam to detect the light and shade changes in a given area of said speckle interference fringe patterns when said reference surface is shifted by said reference surface shifting means,
wherein the initial phase in a given area of said speckle interference fringe patterns is measured by use of signals from said area sensor.

22. A speckle interference apparatus according to claim 21, wherein
said reference surface shifting means causes the reference surface to be shifted for a distance equivalent to $\frac{1}{2}$ of a wavelength of light from said light source.

23. A speckle interference apparatus according to claim 21, wherein a half mirror is arranged in the optical path for said first partial light beam to cause said first partial light beam to be divided by said half mirror into reflecting light and transmitting light, one of which is directed toward said area sensor and the other of which is directed toward said selecting means.

24. A speckle interference apparatus according to claim 21, wherein a movable mirror is arranged in the optical path for said first partial light beam, and said first partial light beam is directed toward said area sensor and one of said selecting means when the light is passed through said mirror and toward the other when it is not passed through said mirror.

25. A speckle interference apparatus according to claim 21, wherein said area sensor is movable, and is detachable so as to be removable from the path of said first partial light beam.

* * * * *

UNITED STATES PATENT AND TRADEMARK OFFICE
CERTIFICATE OF CORRECTION

PATENT NO. : 5,392,121

DATED : February 21, 1995

INVENTORS : KOTARO HOSAKA ET AL.

It is certified that error appears in the above-identified patent and that said Letters Patent is hereby corrected as shown below:

IN THE DRAWINGS

Sheet 5 of 15

FIG. 5, "FRINGS" should read --FRINGE--.

COLUMN 1

Line 27, "form" should read --from--.

COLUMN 2

Line 41, "showing" should read --showing the--.
Line 42, "of the" should read --of--.
Line 47, "the" should be deleted and line 48 "to" should read --to the--.
Line 56, "explaining" should read --explaining the--.
Line 58, "for the" should read --for--.
Line 66, "showing" should read --showing the--.
Line 67, "of the" should read --of--.

COLUMN 3

Line 48, "analogue" should read --analog--.
Line 53, "piezo controller" should read --piezo-controller--.

UNITED STATES PATENT AND TRADEMARK OFFICE
CERTIFICATE OF CORRECTION

PATENT NO. : 5,392,121

DATED : February 21, 1995

INVENTORS : KOTARO HOSAKA ET AL.

It is certified that error appears in the above-identified patent and that said Letters Patent is hereby corrected as shown below:

COLUMN 4

Line 10, "incident" should be deleted.
Line 25, "interfer" should read --interfere--.
Line 60, "paterns" should read --patterns--.

COLUMN 5

Line 33, "positions" should read --positions for--.
Line 36, "a" should be deleted.

COLUMN 7

Line 37, "in case of the" should read --in the case of--.
Line 40, "be" should be deleted.

COLUMN 8

Line 31, "enable" should read --enables--.
Line 49, "from" should be deleted.
Line 53, "candicate" should read --candidate--.

COLUMN 9

Line 23, "reflected" should read --reflected by--.
Line 46, "its" should read --their--.

UNITED STATES PATENT AND TRADEMARK OFFICE
CERTIFICATE OF CORRECTION

PATENT NO. : 5,392,121

DATED : February 21, 1995

INVENTORS : KOTARO HOSAKA ET AL.

It is certified that error appears in the above-identified patent and that said Letters Patent is hereby corrected as shown below:

COLUMN 10

Line 37, "devided" should read --divided--.

COLUMN 12

Line 7, ".phases" should read --phases--.

COLUMN 13

Line 3, "the" should read --provided the--.

COLUMN 14

Line 56, "wade" should read --made--.

COLUMN 18

Line 1, "its" should read --their--.

COLUMN 19

Line 37, "air" should read --spatial--.

COLUMN 20

Line 1, "the" should be deleted.

UNITED STATES PATENT AND TRADEMARK OFFICE
CERTIFICATE OF CORRECTION

PATENT NO. : 5,392,121

DATED : February 21, 1995

INVENTORS : KOTARO HOSAKA ET AL.

It is certified that error appears in the above-identified patent and that said Letters Patent is hereby corrected as shown below:

COLUMN 22

Line 50, "of the" should be deleted.
Line 59, "said" should be deleted.
Line 66-67, "is an air" should be deleted.

COLUMN 24

Line 19, "light" should read --partial light--.
Line 27, "arrange" should read --arranged--.

Signed and Sealed this

Fourth Day of July, 1995

Attest:

BRUCE LEHMAN

Attesting Officer     Commissioner of Patents and Trademarks